(12) United States Patent
Hertzman

(10) Patent No.: US 7,441,340 B2
(45) Date of Patent: Oct. 28, 2008

(54) SURVEYING INSTRUMENT WITH COMPENSATION FOR MECHANICAL ERRORS

(75) Inventor: Mikael Hertzman, Sollentuna (SE)

(73) Assignee: Trimble AB, Danderyd (SE)

( * ) Notice: Subject to any disclaimer, the term of this patent is extended or adjusted under 35 U.S.C. 154(b) by 25 days.

(21) Appl. No.: 10/561,284

(22) PCT Filed: Jun. 23, 2004

(86) PCT No.: PCT/SE2004/001018

§ 371 (c)(1),
(2), (4) Date: Apr. 5, 2007

(87) PCT Pub. No.: WO2004/113835

PCT Pub. Date: Dec. 29, 2004

(65) Prior Publication Data

US 2007/0180716 A1  Aug. 9, 2007

Related U.S. Application Data

(60) Provisional application No. 60/481,009, filed on Jun. 23, 2003.

(30) Foreign Application Priority Data

Jun. 23, 2003  (SE) .................... 0301830

(51) Int. Cl.
*G01C 5/00* (2006.01)
(52) U.S. Cl. ...................................... 33/290
(58) Field of Classification Search .............. 33/290, 33/291, 292
See application file for complete search history.

(56) References Cited

U.S. PATENT DOCUMENTS

| | | | | |
|---|---|---|---|---|
| 5,475,930 A * | 12/1995 | Kimura | ................ | 33/290 |
| 5,485,266 A * | 1/1996 | Hirano et al. | ........... | 33/291 |
| 5,655,307 A * | 8/1997 | Ogawa et al. | ........... | 33/291 |
| 5,689,330 A * | 11/1997 | Gerard et al. | ........... | 33/291 |
| 6,688,011 B2 * | 2/2004 | Gamal et al. | ........... | 33/290 |
| 2003/0229997 A1 * | 12/2003 | Gamal et al. | ........... | 33/290 |
| 2007/0089309 A1 * | 4/2007 | Kodaira | ................ | 33/290 |

* cited by examiner

*Primary Examiner*—G. Bradley Bennett
(74) *Attorney, Agent, or Firm*—Dinsmore & Shohl LLP

(57) ABSTRACT

The invention relates to a method of operating a surveying instrument (10) placed in a orthogonal XYZ-system at (0,0,0) having a movable unit (20), said instrument defining a sight line (128) that is controllably rotatable around a first axis (50), essentially horizontal, and around a second axis (90), essentially vertical, wherein said second axis (90) may be inaccurately positioned so that it deviates from a true vertical axis, and said first axis (50) may deviate from being orthogonal to the second axis (90); the method comprising the steps of determining at least one of the following group of errors relating to the instrument and/or its location: a) a trunnion axis error T as a function of the deviation from 90 degrees between the first axis (50) and the second axis; b) a horizontal collimation error CH, being the deviation between the sight line (128) and the perpendicular angle as related to the first axis (50); and c) a total plumb error defined by components, PI and PII, being two separate angular values defining the tilt of the instrument as related to the plumb line through the same; and d) using these determined values in continuously controlling the alignment when aiming the instrument. The invention also relates to a surveying instrument for use with the method and an error compensation system for a surveying instrument.

58 Claims, 12 Drawing Sheets

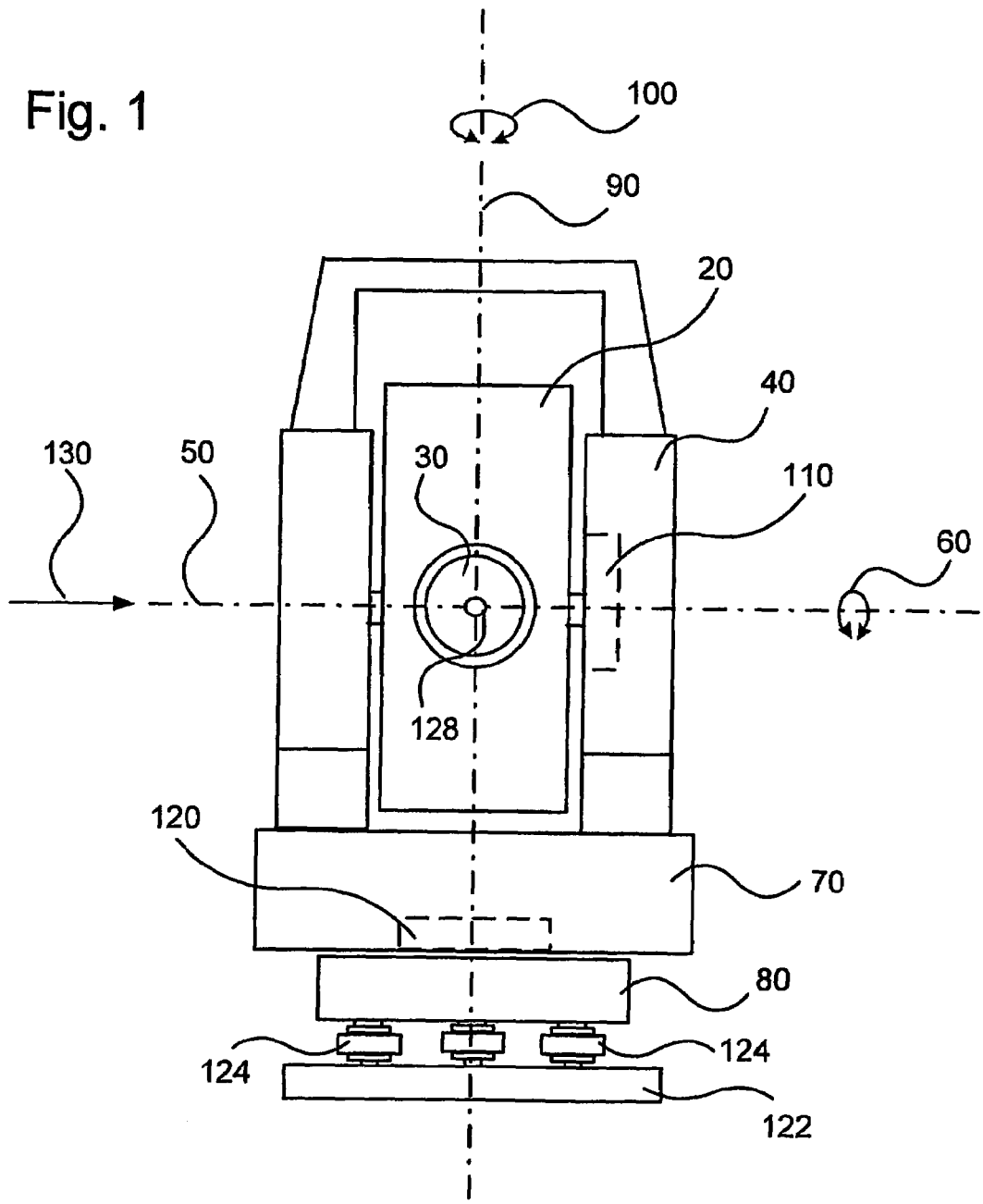

horizontal circle horizontal circle horizontal direction of sight line

H horizontal reference direction

SURVEYING INSTRUMENT WITH COMPENSATION FOR MECHANICAL ERRORS

TECHNICAL FIELD OF THE INVENTION

The present invention relates to a surveying instrument, and to a method of operating a surveying instrument.

FOR THE PURPOSE OF THIS DESCRIPTION AND CLAIMS

The following wordings should for the purpose of this description and claims be understood to define the listed descriptions:

(0,0,0) in a right handed X,Y,Z-coordinate system to be a point on the sightline of the surveying instrument and in the middle of the same for the purpose of the calculations. This coordinate system may of course be transformed into any other system having its (0,0,0) placed elsewhere.

Horizontal angle H is defined by the angle between the Y-axis and the projection in the XY-plane of a line through the origin of the coordinate system and an arbitrary point P.

Vertical angle V is defined as the angle between the Z-axis and the sightline to the arbitrary point aimed at.

Aiming should in this context be taken not only as aiming at a specific point but also following an arbitrary line.

True verticality is to be taken as a movement of the sightline along a plumb line.

DESCRIPTION OF RELATED ART

Total stations are precision survey instruments that allow a user to electronically measure the distance, as well as the vertical and horizontal angles, between the total station and any points to be surveyed. These types of measurements require a high degree of accuracy, with acceptable tolerances measured in arc-seconds for angles and millimeters for distance. The manufacture of a prior art total station therefore involves high precision trimming and adjustment of certain mechanical parts whose function affects the measurements-to-be-performed.

In addition to the demand for precision, it is also important that these instruments be easy and convenient to use, because of the difficult terrain and other extreme conditions that may be present in the location where the total station is to be employed. When using a prior art total station, it is necessary for the user to precisely level the instrument within a manufacturer-specified range before measurements are taken.

U.S. Pat. No. 6,138,367 discloses a total station that includes a rotational alidade portion and an angle encoder for measuring the rotational orientation of the rotational alidade portion. The total station disclosed by U.S. Pat. No. 6,138,367 further includes tilt sensors connected to a tilt predictor. The tilt predictor predicts the degree of tilt of the rotational alidade portion of a total station corresponding to the rotational orientation of the rotational alidade portion. The tilt predictor is coupled to a screen that displays the measurement results to the user.

SUMMARY

An aspect of the invention relates to the problem of further simplifying the task for an operator of a surveying instrument, while enabling reduced production costs for such a surveying instrument.

According to an embodiment of the invention this problem may be solved by using a method for operating a surveying instrument wherein said surveying instrument (10) is placed in a orthogonal XYZ-system at (0,0,0) having a movable unit, said instrument defining a sight line that is controllably rotatable around a first axis, essentially horizontal, and around a second axis, essentially vertical, wherein said second axis may be inaccurately positioned so that it deviates from a true vertical axis, and said first axis may deviate from being orthogonal to the second axis; the method comprising the steps of determining at least one of the following group of errors relating to the instrument and/or its location:

a) a trunnion axis error T as a function of the deviation from 90 degrees between the first axis (50) and the second axis;
b) a horizontal collimation error $C_H$, being the deviation between the sight line (128) and the perpendicular angle as related to the first axis; and
c) a total plumb error defined by components, $P_I$ and $P_{II}$, being two separate angular values defining the tilt of the instrument as related to the plumb line through the same; and
d) using these determined values in continuously controlling the alignment when aiming the instrument.

The origin of the coordinate system (0,0,0) used in the method is preferably placed in the center of the instrument, but using transformations well know to the man skilled in the art other setting of the origin is possible.

It should be noted that of the three errors mentioned above one may be used in the method. However, using still another error in the compensation will give a better result and using all three of the errors will of course improve the result.

According to a further embodiment of the invention this problem is addressed by an error compensation system for a surveying instrument comprising:

an automatic error measurement system for detecting a tilt error and an error due to mechanical imperfections in said surveying instrument;

a controller adapted to automatically compensate for said detected errors so as to improve an operating accuracy of said surveying instrument.

This solution advantageously causes a sight line of the surveying instrument to move in a vertical direction with reduced or eliminated deviation from true verticality in response to a changed vertical reference value. According to an embodiment said controller co-operates with said automatic error measurement system so as to cause a sight line of said surveying instrument to move in a vertical direction in response to manual control of a vertical direction reference value ($R_V$) wherein the error from true verticality is less than a predetermined amount.

Likewise, this solution advantageously causes the sight line to move in a horizontal direction with reduced or eliminated deviation from true horizontality in response to a manually changed horizontal reference value. According to an embodiment said controller co-operates with said automatic error measurement system to cause a point, on a sight line, at an arbitrary fixed distance from said surveying instrument to move in a horizontal direction in response to manual control of a horizontal direction reference value ($R_H$) wherein the error from true horizontal is less than a predetermined amount.

The magnitude of a predetermined threshold value $D_F$ determines the vertical and/or horizontal accuracy of the aim achieved. According to an embodiment the threshold value $D_F$ corresponds to an angle of ten arc seconds or less. According to another embodiment the threshold value $D_F$ corresponds to an angle of one arc second or less. According to a preferred embodiment the threshold value $D_F$ corresponds to an angle of one third of an arc second. According to a most preferred embodiment the threshold value $D_F$ corresponds to an angle of less than one third of an arc second. This is advantageous to the user of the surveying instrument, for example when inspecting structures such as buildings, "as built". A surveying instrument equipped with the error compensation system according to the invention simplifies the task of inspecting structures by making it easier to ascertain e.g. whether a wall is truly vertical. Moreover, the error compensation system according to the invention makes it possible for the manufacturer of the surveying instrument to allow larger mechanical imperfections in said surveying instrument without any negative consequences to the customer or user. For example, the manufacturer can allow a larger trunnion axis error in the surveying instrument. This allows for simplified production, which in turn reduces production costs. According to an embodiment of the invention the detected errors include tilt errors as well as a trunnion axis error.

The above mentioned problem is also addressed by a method of operating a surveying instrument having a movable unit that is controllably rotatable around a first axis and around a second axis, wherein said second axis may be inaccurately positioned so that it deviates from a true vertical axis, and said first axis may deviate from being orthogonal to the second axis; the method comprising the steps of:

a) setting a horizontal reference value $R_H$ indicative of a desired horizontal orientation of said movable unit 20;

b) detecting a horizontal orientation value Hs indicative of a current rotational orientation around said second axis 90;

c) receiving a horizontal orientation correction value $H_{EC}$; DH indicative of a horizontal orientation deviation of said movable unit 20; wherein said horizontal orientation correction value $H_{EC}$; DH is generated in dependence of a transverse plumb error value $P_I$; $P'_I$; said transverse plumb error value $P_I$; $P'_I$ being dependent on said horizontal orientation of said movable unit 20; and wherein said received horizontal orientation correction value $H_{EC}$; DH is dependent on the vertical orientation V of the movable unit 20 so as to compensate for horizontal orientation deviations that may occur as a consequence of pivoting around said first axis 50;

d) generating a horizontal position value H indicative of a current horizontal orientation of said movable unit 20 in response to said horizontal orientation value Hs and said horizontal orientation correction value $H_{EC}$; DH;

e) generating a horizontal error value $e_H$ in dependence on said horizontal position value (H) and said horizontal reference value $R_H$;

f) automatically controlling the horizontal orientation of the movable unit (20) in dependence of said horizontal error value $e_H$.

This solution allows for larger mechanical inaccuracy in the surveying instrument while achieving improved accuracy in the aiming of the instrument. Moreover, this solution enables an operator to aim in a desired direction with less required user interaction. For example, when an operator wishes to move the aim of the sight line from a first target in a first horizontal direction and a first vertical direction to a second target in the same horizontal direction but at a different second vertical direction; Then this method enables the operator to achieve that goal by the simple action of operating a vertical control knob only so as to change the vertical reference value. Whereas a prior art instrument, when being operated with the vertical control knob only, causes a slight shift in the horizontal aim due to inherent mechanical inaccuracies in the instrument and to leveling errors, the instrument according to an embodiment of the invention compensates for such inaccuracies.

Additionally this solution advantageously also allows for lower production costs of the surveying instrument, since the need for mechanical trimming of the instrument in connection with its production may be eliminated, or at least reduced.

Moreover, this solution enables manufacture of a more sturdy and stable surveying instrument, since some mechanical trimming means can be eliminated. Such mechanical trimming means are often vulnerable to mechanical shock, which may render a reduced accuracy when using a surveying instrument with such mechanical trimming means after having exposed it to mechanical shock e.g. by bringing it on a bumpy ride in a car.

Rather than mechanically trimming the surveying instrument to adjust e.g. the mutual position of the first axis and second axis in connection with manufacture, the aim of the surveying instrument according to an aspect of the invention is automatically adjusted so as to compensate for any mechanical errors. The elimination of mechanical trimming means reduces the mechanical complexity of the instrument and it eliminates or reduces the need for mechanical trimming during the production of the surveying instrument. Therefore this solution allows for lower production costs. This is because the error determination mechanism is not subject to the mechanically induced errors inherent in the fundamental design of the instrument, but is totally independent. By determining the exact error as a function of the two different axes of rotation, relative to an independent reference system, and automatically incorporating the corrections needed to exactly compensate for the mechanical errors, the invention produces an improved level of accuracy in the actual measurements, and true orthogonality of axis movement; this in turn produces much greater conformity to true vertical and horizontal repositioning by the user.

This solution makes it possible to accurately indicate a vertical line on a wall using the apparatus according to an aspect of the invention, even when the apparatus is mounted in a non-ideal position, e.g. if the apparatus is not exactly leveled.

This solution makes it possible to accurately indicate a horizontal line or a line between two points on a wall using the apparatus according to an aspect of the invention, even when the apparatus is mounted in a non-ideal position, e.g. if the apparatus is not exactly leveled. The expression "on a wall" may of course not necessarily indicate that the line is on a wall but rather that the line is straight and essentially perpendicular to the measuring/indicating beam.

A special application of this feature arises when setting out a horizontal direction that is exactly opposite to a given horizontal direction. This can traditionally be achieved by turning only the vertical motion knob to change the vertical angle approximately 180 degrees. Provided that the axes in the instrument are perfectly positioned, the new horizontal direction will be exactly opposite the reference direction. If not, the horizontal aim has to be adjusted to achieve the goal.

BRIEF DESCRIPTION OF THE DRAWINGS

For simple understanding of the present invention, it will be described by means of examples and with reference to the accompanying drawings, of which FIG. 1 is a front view of a surveying instrument according to an embodiment of the invention.

DETAILED DESCRIPTION OF EMBODIMENTS

Figure 2A:
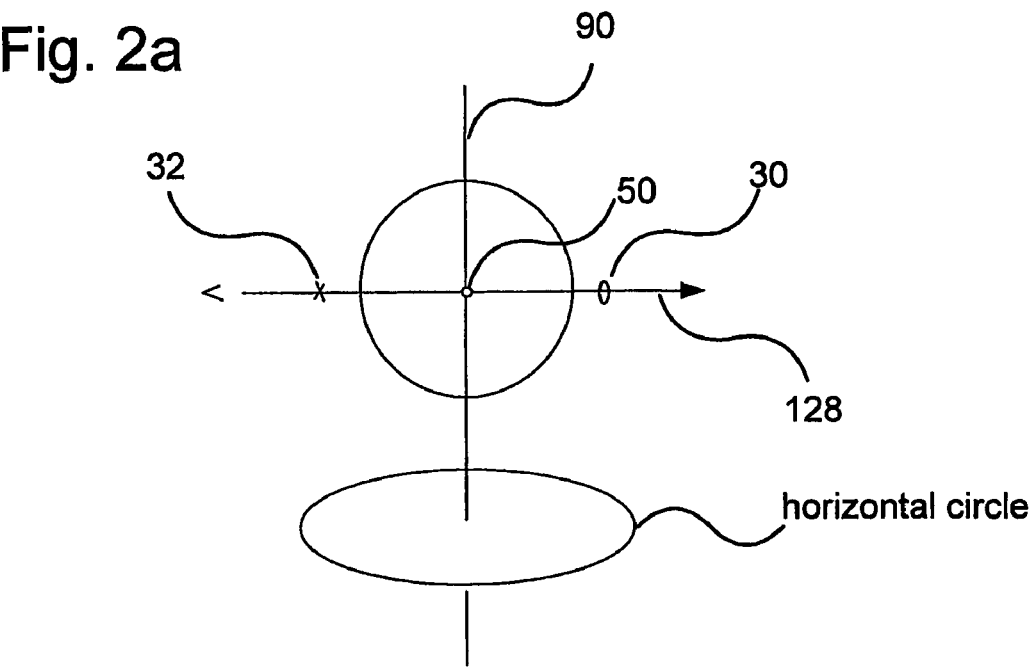
FIG. 2A is a view as seen looking in the direction of arrow 130 in FIG. 1, illustrating various axes in the surveying instrument.

In the following description similar features in different embodiments will be indicated by the same reference numerals.

FIG. 1 shows a front view of a surveying instrument 10 of the type commonly referred to as a total station or theodolite. An embodiment 10 of a surveying instrument according to the invention includes a movable unit 20, comprising optical equipment, as represented by a lens 30. The movable unit 20 is supported in a housing 40 in such a manner that it is pivotable relative to the housing 40 around a first axis 50, as indicated by double arrow 60. The first axis 50 may also be referred to as the trunnion axis.

The housing 40 comprises a lower portion 70 by means of which it is supported on a base 80 in such a manner that lower portion 70 is rotatable relative to the base 80 around a second axis 90, as indicated by double arrow 100. The housing 40 may also be referred to as the alidade portion 40.

Thus, by rotating the movable unit 20 around the two axes 50 and 90 the movable unit 20 can be oriented in any desired position for the purpose of carrying out an intended surveying operation.

For movement of the movable unit 20 around the axis 50 there is provided a drive arrangement 110 in the housing 40, and for movement of the housing 40 and the movable unit 20 around the axis 90 there is provided a similar drive arrangement 120 in the lower portion 70 of housing 40.

During operation the surveying instrument 10 may be set up so that the second axis 90 extends in a substantially vertical direction (FIG. 1). For example, the surveying instrument 10 may, during operation, be supported via the base 80 on a stand 122. Between the stand 122 and the base 80 there may be provided adjusters 124 for enabling leveling of base 80 in relation to the stand 122. The individual adjusters 124, provided between the stand 122 and the base 80, may be expandable and contractible to enable setting so that the second axis 90 extends in a substantially vertical direction (FIG. 1).

FIG. 2A is a view as seen looking in the direction of arrow 130 in FIG. 1. FIG. 2A illustrates various axes in the surveying instrument. The movable unit 20 (FIG. 1) comprises optical equipment, as represented by the lens 30, and a hair cross 32 (FIG. 2A) defining a sight line 128. The sight line 128 may be aimed at a target for the purpose of performing a measurement. With reference to FIG. 2A, the sight line 128 would, in an ideal case, always be perpendicular to trunnion axis 50.

Moreover, the trunnion axis 50 would, in an ideal case, always be perpendicular to the second axis 90.

Figure 2B:
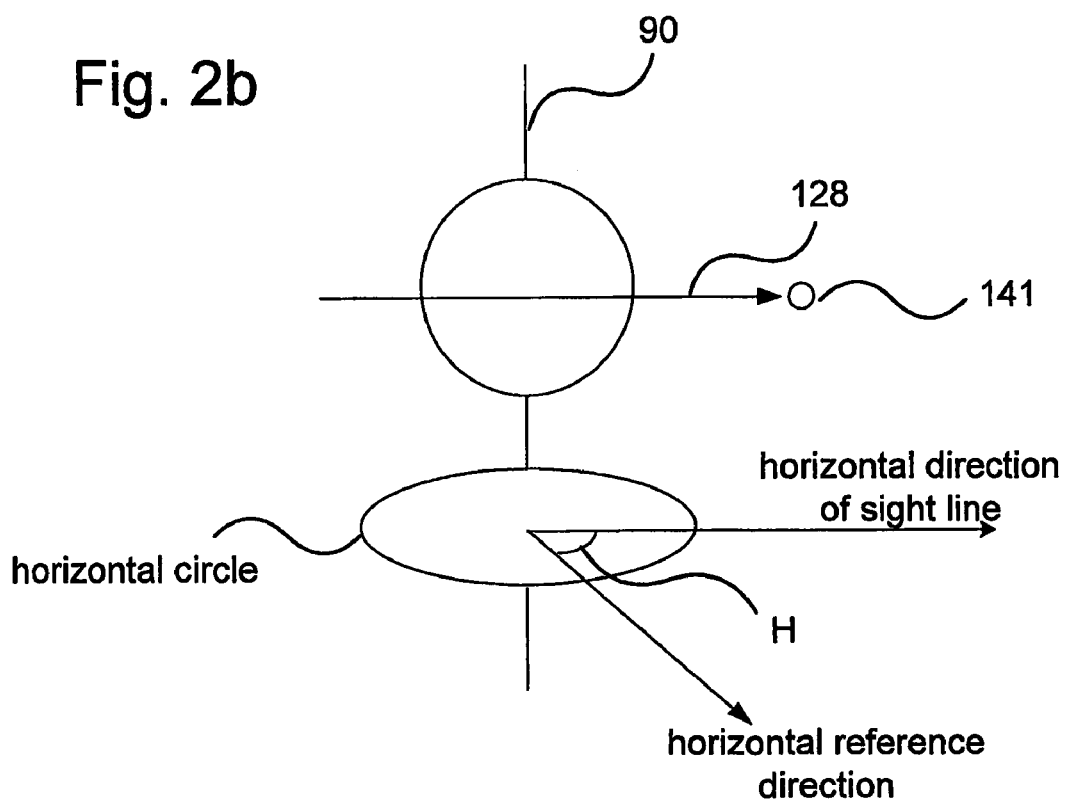
FIG. 2B illustrates the angular direction (H, V) of the sight line, when the surveying instrument is aimed at a target for the purpose of performing a measurement.

FIG. 2B illustrates the angular direction (H, V) of the sight line, when the surveying instrument 10 is aimed at a target 141 for the purpose of performing a measurement. FIG. 2B illustrates a (non-realistic) ideal case, i.e. when second axis 90 is exactly vertical, the trunnion axis 50 is exactly perpendicular to axis 90, and the sight line 128 is exactly perpendicular to trunnion axis 50.

Figure 2C:
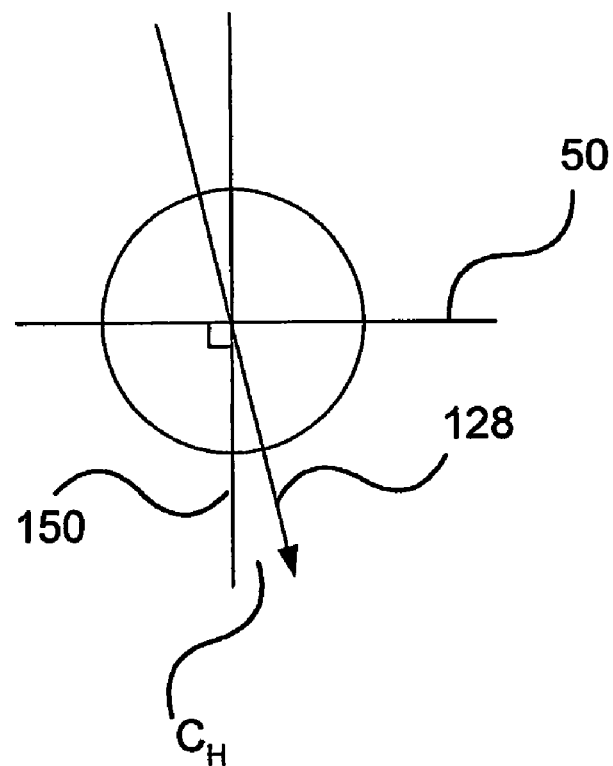
FIG. 2C is a view as seen looking in the direction of arrow 140 in FIG. 1, for illustrating the Horizontal Collimation error $C_H$ in the surveying instrument of FIG. 1.

Unfortunately, in a real case, there will always exist some mechanical imperfections. These imperfections, albeit minute, may cause the direction of the sight line 128 to deviate from the perpendicular angle in relation to trunnion axis 50. This angular deviation is herein referred to as the Horizontal Collimation error $C_H$. FIG. 2C is an illustration the Horizontal Collimation error $C_H$ in the surveying instrument 10. FIG. 2C is a view as seen looking in the direction of arrow 140 in FIG. 1. In other words, FIG. 2C is a view as seen looking down the vertical rotation axis 90 in FIG. 1. As illustrated in FIG. 2C, an axis 150 is perpendicular to the trunnion axis 50 in the Horizontal plane, and the Horizontal Collimation error $C_H$ is the angle between axis 150 and the sight line 128. The value of the Horizontal Collimation error $C_H$ may be adjusted by trimming the position of the haircross 32 (FIG. 2A) in relation to the lens 30. Any remaining Horizontal Collimation error $C_H$ can be compensated for in the manner described below.

Figure 2D:
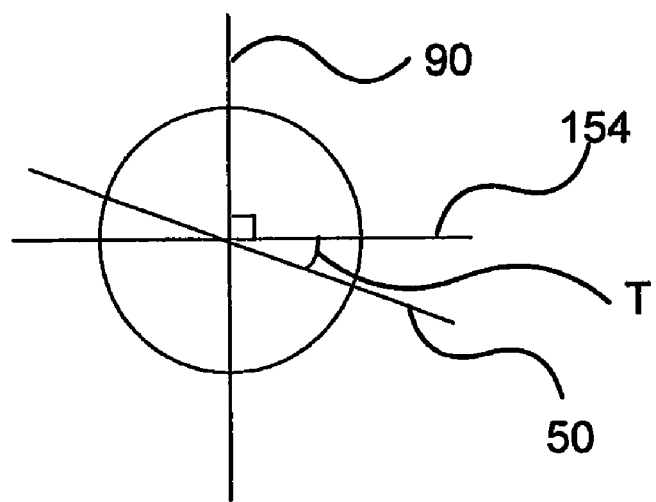
FIG. 2D illustrates the trunnion axis error T as seen in the same perspective as the observer sees FIG. 1.

The departure from right angles between the trunnion axis 50 and the second axis 90 is herein referred to as the Trunnion axis error T. FIG. 2D illustrates the Trunnion axis error T as seen in the same perspective as the observer sees FIG. 1. As illustrated in FIG. 2D, an axis 154 is perpendicular to the second axis 90, and the Trunnion axis error T is the angle between axis 154 and the trunnion axis 50. The value of the Trunnion axis error T may be adjusted by trimming the position of one bearing position of the Trunnion axis (FIG. 1 and FIG. 2D) in relation to the second axis 90. Any remaining Trunnion axis error T can be compensated in the manner described below.

Figure 2E:
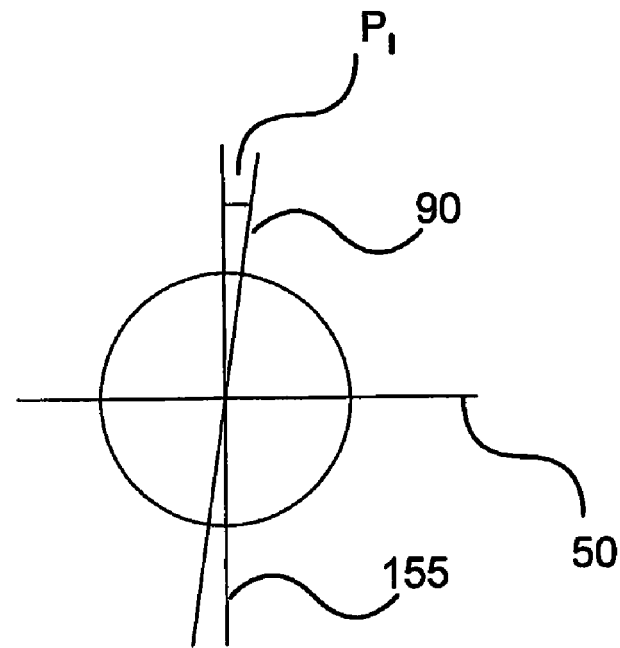
FIG. 2E illustrates the second axis 90, a truly vertical line 155 and the trunnion axis 50 as seen in the perspective the observer sees FIG. 1. An angular deviation, as illustrated in FIG. 2E, between the vertical line 155 and the second axis 90 is denoted $P_I$.
Figure 2F:
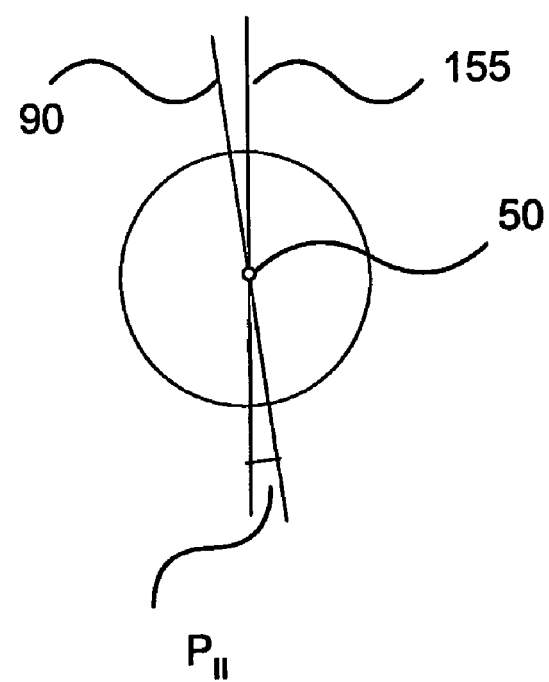
FIG. 2F illustrates the second axis 90 in a perspective perpendicular to the perspective of FIG. 2E. An angular deviation, as illustrated in FIG. 2F, between the vertical line 155 and the second axis 90 is denoted $P_{II}$.

With reference to FIG. 1, the adjusters 124 should ideally be set so that axis 90 is vertical. Unfortunately, however, there will often be deviations in a real case. FIG. 2E illustrates the second axis 90, a truly vertical line 155 and the trunnion axis 50 as seen in the perspective the observer sees FIG. 1. An angular deviation, as illustrated in FIG. 2E, between the vertical line 155 and the second axis 90 is denoted $P_I$. FIG. 2F illustrates the second axis 90 and the truly vertical line 155 as seen in the direction of arrow 130 in FIG. 1. Hence FIG. 2F illustrates the second axis 90 in a perspective perpendicular to the perspective of FIG. 2E. An angular deviation, as illustrated in FIG. 2F, between the vertical line 155 and the second axis 90 is denoted $P_{II}$. The angular deviations $P_I$ and $P_{II}$ taken together are herein referred to as the total plumb error. Hence, the total plumb error may be described by the combination of two angular values $P_I$ and $P_{II}$. The plumb error values $P_I$ and $P_{II}$ may be adjusted and reduced by means of the adjusters 124 (FIG. 1).

A First Embodiment of a Control System

Figure 3:
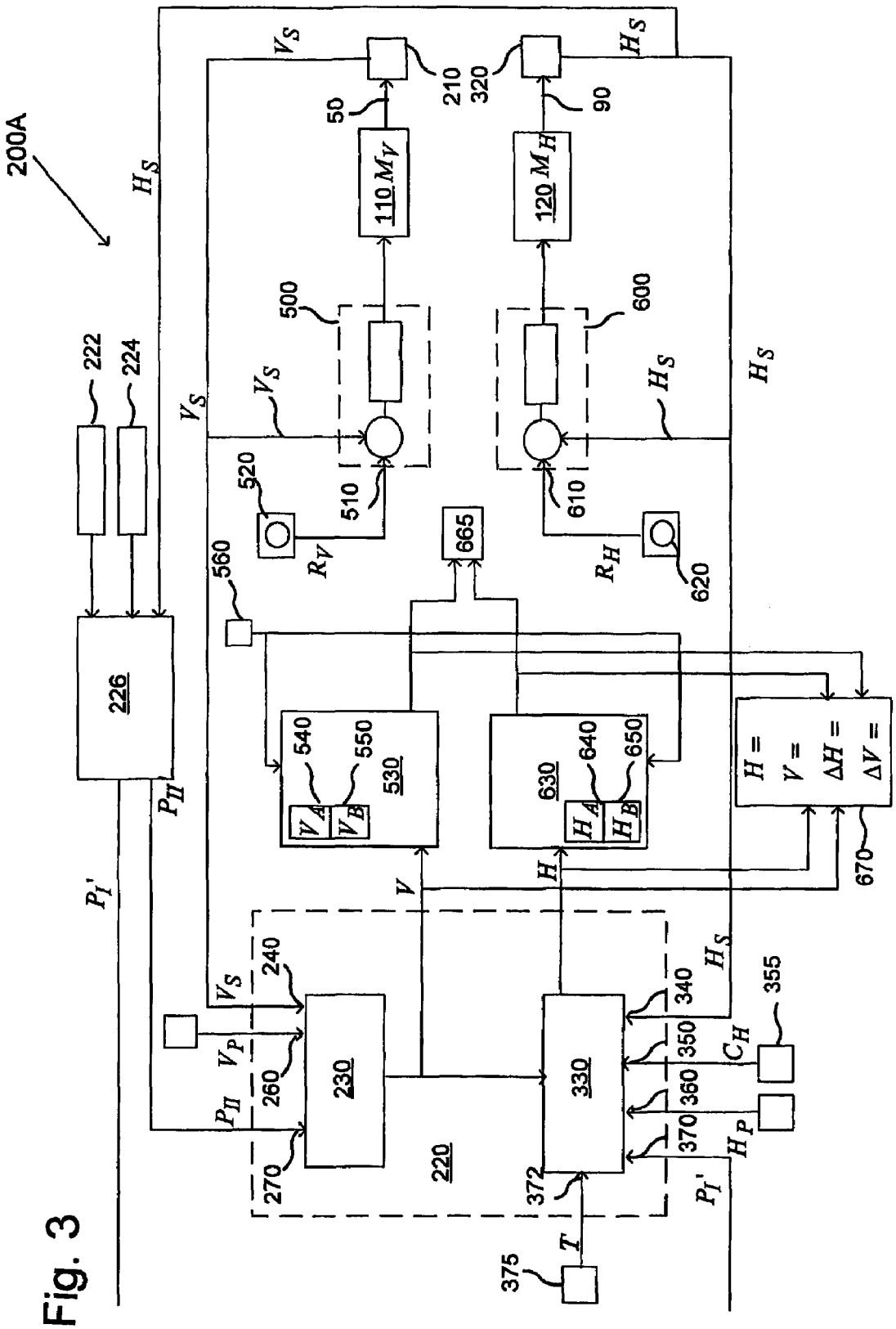
FIG. 3 shows a schematic block diagram of a first embodiment of a control system 200 for use in a surveying instrument of the type shown in FIG. 1.

FIG. 3 shows a schematic block diagram of a first embodiment of a control system 200 for use in a surveying instrument 10 of the type shown in FIG. 1.

As indicated above, driver 110 is adapted to cause the movement of the movable unit 20 around the first axis 50, also referred to as the trunnion axis. The angle of deviation of the sight line from a truly vertical line is herein denoted V. Hence, activation of driver 110 is the main cause for change of the angle V.

Likewise, driver 120 causes the movement of the housing 40 around the second axis 90. The angle H is the angular deviation from a horizontal reference direction. The reference direction may, e.g. be the direction towards north. Hence, activation of driver 120 is the main cause for change of the angle H.

Control of Vertical Output Value V

With reference to FIG. 3, a sensor 210 is provided for detecting the vertically angular position of the movable unit 20 relative to the alidade portion 40. The signal generated by sensor 210 is denoted Vs. The sensor 210 is connected to a controller 500 for delivering the detected signal Vs as a negative feedback in the control of driver 110. The controller 500 has an input 510 for a vertical reference signal $R_V$. According to one embodiment the vertical reference signal $R_V$ is generated by user interaction, e.g. when a user turns a control knob 520. According to another embodiment the vertical reference signal value $R_V$ is derived from co-ordinates indicating a desired orientation of movable unit 20.

The sensor 210 is also connected to a calculation unit 220 for delivering the detected signal Vs. The calculation unit 220 is adapted to generate the vertical angle value V and the horizontal angle value H, in the manner indicated below.

The calculation unit 220 comprises a first calculator 230 having an input 240 for receiving the detected vertical signal Vs. The first calculator 230 also has an input 260 for receiving a signal indicative of a Vertical index Vp, and input 270 for receiving an signal indicative of a longitudinal plumb error $P'_{II}$.

Plumb error values $P_I$ and $P_{II}$ may be measured by means of electronic tilt sensors 222 and 224, respectively. The tilt sensors 222, 224 are typically integrated into the total station, and the data from the tilt sensors may be visually displayed to the user on a screen present on the total station. Plumb error values $P_I$ and $P_{II}$ may also be referred to as tilt error values.

According to one embodiment an electronic tilt sensor 222, 224 is comprised of a vial filled with fluid. The fluid in the vial is free to move, so that if the tilt sensors are not level, the level of the fluid in the vial is different from the fluid level if the tilt sensors are level. In another embodiment, an electronic tilt sensor 222, 224 includes elements suspended by wires that are used to determine the relationship between the vertical axis of the instrument and the true vertical line. The amount of tilt is measured in arc-seconds. Typical electronic tilt sensors are capable of measurements within one (1) arc-second of angle.

According to an embodiment of the invention the surveying instrument 10 includes: a housing 40, also referred to as alidade portion 40; tilt sensors 222, 224 coupled to said alidade portion, and a tilt predictor 226 adapted to predict degree of tilt of said rotational alidade portion corresponding to a rotational orientation of said rotational alidade portion. This is described in more detail in U.S. Pat. No. 6,138,367, the content of which is hereby incorporated by reference. The predicted degree of tilt is defined by the combination of the two angular values $P'_I$ and $P'_{II}$.

In the embodiment shown in FIG. 3, the input 270 in coupled to receive the predicted longitudinal plumb error value $P'_{II}$ from the tilt predictor 226.

According to another embodiment a tilt sensor delivers a longitudinal plumb error value $P_{II}$ directly on the input 270.

An advantage attained by the use of a tilt predictor is the provision of a substantially instantaneous information of the tilt status. By contrast, a tilt sensor as such is relatively slow, and the output has to stabilize before being read, wherefore the movable unit 20 would have to remain immobile for a while before the output of the tilt sensor becomes reliable.

According to an embodiment of the invention the first calculator 230 generates an output signal V in accordance with the following equation:

$$V = Vs + Vp + P'_{II} \quad (1)$$

wherein Vp is a vertical index value.

The value of Vp can be selected e.g. such that the output signal V is 90 degrees when the movable unit 20 is aimed such that the sight line 128 is horizontal.

The output signal V is delivered to device 530. The device 530 includes a memory having a first memory position 540 for a vertical start value VA, and a second memory position 550 for storing a vertical end value. The control system 200A also includes a user input device 560. The method of operation of the control system 200A is described in detail with reference to FIG. 4 below.

It is to be noted that the presence of a longitudinal plumb error value $P'_{II}$ in equation (1) inherently renders the vertical orientation of the movable unit 20 dependent on its horizontal orientation, when the longitudinal plumb error value $P_{II}$ deviates from zero. This conclusion is due to the fact that the value of the longitudinal plumb error $P_{II}$ varies in response to rotation around the second axis 90. The solution according to an aspect of the invention compensates for this inherent drawback by providing a control system with a negative feedback, wherein a feedback value V is responsive to the longitudinal plumb error value $P_{II}$. As described below in connection with FIG. 4, the value V can be differentiated to generate a vertical orientation correction value DV to be used in control of the vertical orientation of the movable unit 20. Thus an error in vertical orientation of the movable unit, dependent on the horizontal position of the movable unit, can be compensated. This advantageous result is clearly illustrated by the FIG. 3, showing that the predictor 226 can calculate the longitudinal plumb error value $P'_H$ in response to the detected horizontal position Hs, that the first calculator 230 calculates the value V in response to the predicted longitudinal plumb error value $P'_H$, that an aim corrector 665 can generate a value DV indicative of a vertical deviation, wherein the value DV depends on changes in the value V;

that the value DV is used as a negative feedback signal in controller 500 for adjusting the vertical aim.

Control of Horizontal Output Value H

With reference to FIG. 3, a sensor 320 is provided for detecting the horizontal angular position of the housing 40 relative to the base 80. The signal generated by sensor 320 is denoted Hs. The sensor 320 is connected to a controller 600 for delivering the detected signal Hs as a negative feedback in the control of driver 120. The controller 600 has an input 610 for a horizontal reference signal $R_H$. According to one embodiment the horizontal reference signal $R_H$ is generated by user interaction, e.g. when a user turns a control knob 620. According to another embodiment the horizontal reference signal value $R_H$ is derived from co-ordinates indicating a desired orientation of movable unit 20.

The sensor 320 is also connected to the calculation unit 220 for delivering the detected signal Hs. The calculation unit 220 is adapted to generate horizontal angle value H, in the manner indicated below.

The calculation unit 220 comprises a second calculator 330 having an input 340 for receiving the detected horizontal signal Hs. The second calculator 330 also has an input 350 for receiving a calibration value indicative of a horizontal collimation error $C_H$, and an input 360 for receiving a value indicative of a preset horizontal angle $H_P$, and an input 370 for receiving an signal indicative of a transverse plumb error $P_I$. In the embodiment shown in FIG. 3, the input 370 in coupled to receive a predicted transverse plumb error value $P'_I$ from the tilt predictor 226. A tilt predictor advantageously provides substantially instantaneous information of the tilt status, as mentioned above.

According to another embodiment the transverse plumb error $P_I$ is received directly from a tilt sensor 222.

The second calculator 330 also has an input 372 for receiving a value indicative of a trunnion axis error T. According to an embodiment of the invention the second calculator 330 generates an output signal H in accordance with the following equation:

$$H = Hs + H_P + C_H/\sin V + (T+P_I)*\cot V \qquad (2)$$

wherein $H_P$ is a reference value.

The value of $H_P$ can be defined by the user e.g. by aiming the movable unit 20 at a known reference target, and entering the horizontal angle to be displayed when the movable unit 20 is aimed towards that reference target. The user may for example aim due north, and enter "zero" as the value H to be displayed for that horizontal angular position.

The output signal H is delivered to device 630. The device 630 includes a memory having a first memory position 640 for a horizontal start value $H_A$, and a second memory position 650 for storing a horizontal end value $H_B$.

The devices 530 and 630 are coupled to an aim corrector 665. The aim corrector 665 is coupled to controllers 500 and 600, respectively, so as to enable adjustment of vertical and horizontal aim, respectively. The user interface 560 is also coupled to the aim corrector 665. A method of operating the surveying instrument 10 and the control system 200 is described in with reference to FIG. 4 below.

According to an embodiment of the invention, the surveying instrument 10 also comprises a display 670 by means of which a user can read the measured values V and H, respectively.

It is to be noted that the presence of output signal value V in equation (2) illustrates that the horizontal orientation of the movable unit 20 is inherently dependent on its vertical orientation. The solution according to an aspect of the invention compensates for this inherent drawback by providing a control system with a negative feedback, wherein a feedback value H is responsive to the output signal value V. As described below in connection with FIG. 4, the value H can be differentiated to generate a horizontal orientation correction value DH to be used in control of the horizontal orientation of the movable unit 20. Thus an error in horizontal orientation of the movable unit, dependent on the vertical position of the movable unit, can be compensated. This advantageous result is clearly illustrated by the FIG. 3, showing that the second calculator 330 has an input for receiving the output signal value V.

that the aim corrector 665 can generate a value DH indicative of a horizontal deviation, wherein the value DH depends on changes in the value H;

that the value DH is used as a negative feedback signal in controller 500 for adjusting the horizontal aim.

A Method of Operating a Surveying Instrument

Figure 4:
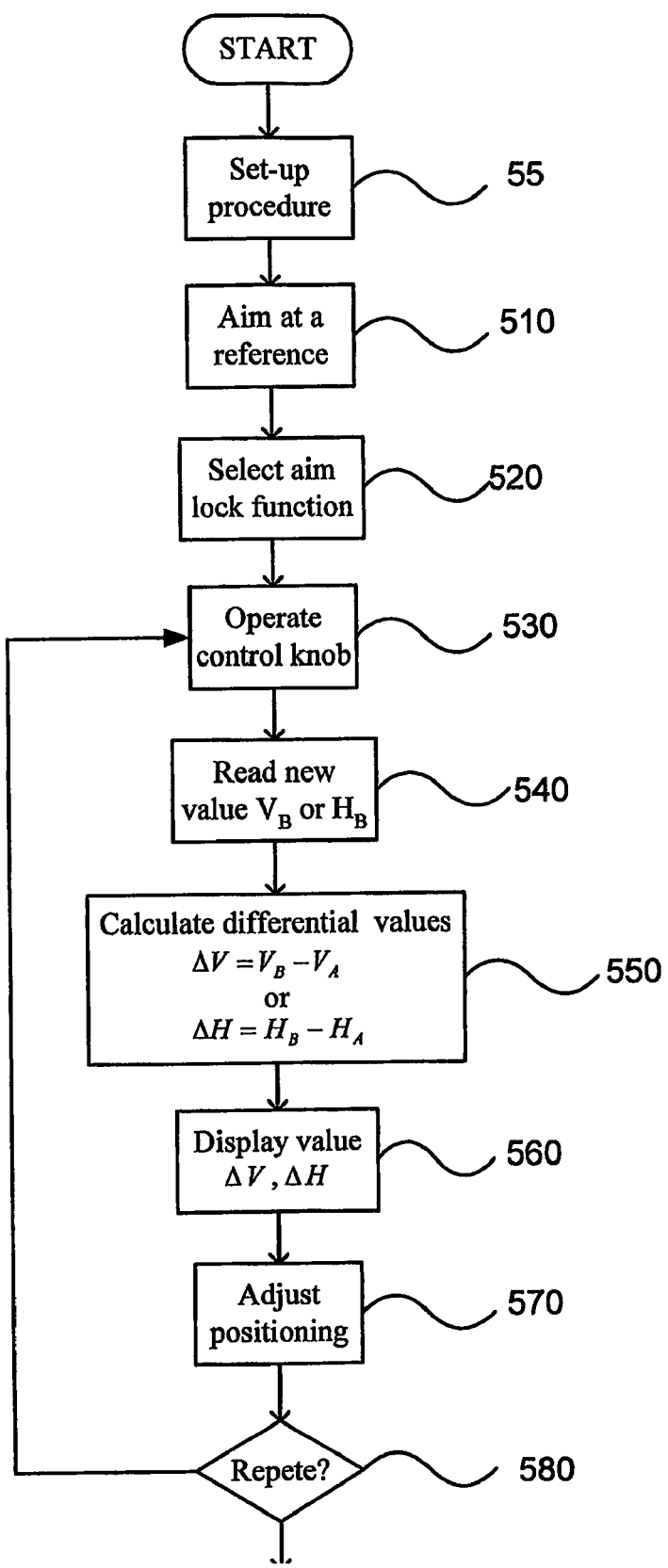
FIG. 4 is a flow chart illustrating an embodiment of a method of operating a surveying instrument when the surveying instrument comprises a control system as described with reference to FIG. 3.

FIG. 4 is a flow chart illustrating an embodiment of a method of operating a surveying instrument 10 when the surveying instrument 10 comprises a control system as described with reference to FIG. 3.

An operator wishing to perform a measurement may start by setting up the stand 122 (See FIG. 1) and adjusting the adjusters 124 so as to at least roughly level base 80 of the surveying instrument 10 in relation to a truly horizontal plane. The aim of this leveling may be to set the second axis 90 so that it is substantially vertical.

A Set-up Procedure

The operator may perform a set-up procedure (Step 55 in FIG. 4) for establishing the relevant values of Horizontal Collimation error $C_H$ and Trunnion axis error T. According to a preferred embodiment the set-up procedure also includes initiation of the tilt predictor so as to enable quick and accurate delivery of relevant predicted plumb error values $P'_I$ and $P'_H$ for any rotational position subsequently selected. In FIG. 4 a box S5 illustrates this set-up procedure.

In order to establish the error value $C_H$ the instrument 10 is aimed at first target, and the calculation unit 220 delivers angular values V and H. These values are stored. In a subsequent step the instrument 10 is operated so as cause the driver 120 to turn the movable unit half a revolution in the horizontal sense, and so as cause the driver 110 to turn the movable unit in the vertical sense, to an aim very close to the first target. Thereafter the instrument is finely adjusted to aiming at the first target again, and reading the angular values V and H delivered by calculation unit 220. A numerical value representative of the error value $C_H$ can be calculated in response to these measurement values. The first target should preferably be selected so that the sight line is roughly horizontal for the purpose of achieving an accurate measure of the error value $C_H$. The established Horizontal Collimation error $C_H$ is stored in a memory 355.

A second set-up procedure, similar to the set-up procedure described above, may be used for the purpose of establishing a numerical value for the trunnion error T. This second procedure, however, uses a target that is not close to the horizontal plane. The established value for the trunnion error T is stored in a memory 375.

When the set-up procedure has been performed the calculation unit 220 of surveying instrument 10 delivers angular values V and H with an advantageously high degree of accuracy.

Thereafter the operator may operate the control knobs 520 and 620 so as to aim the sight line 128 onto a reference point (Step 510, FIG. 4). Once the instrument is aimed at the reference point, the sensors described above will deliver relevant input signals to the calculation unit 220, resulting in a delivery of angular values V and H, respectively on the outputs of calculation unit 220.

A Vertical Aim Lock Function

Desiring to change the horizontal aim H by a certain angle, while intending to maintain unchanged vertical aim V, the operator may now select a function "vertical aim lock" (Step 520, FIG. 4). This function may be selected by means of a user interface 560 (FIG. 3). Selection of the vertical aim lock function tells the surveying instrument 10 to make automated corrections for any deviations in vertical aim.

The selection of function "vertical aim lock" causes the device 530 to receive the angular values of the present aim. Hence, it may be advantageous to aim at a reference target before selection of function "vertical aim lock". Moreover, the device 530 reads the value V (See FIG. 3), here denoted $V_A$, and stores that value in the memory location 540. Similarly, the device 630 reads the value H, here denoted $H_A$ and stores the value $H_A$ in the memory location 640. At this stage the operator may also be able to read the measured angular values $V=V_A$, $H=H_A$ in the display 670 (FIG. 3).

In a step (Step 530, FIG. 4) the operator may turn the knob 620 for changing the horizontal aim by a certain angle, while intending to maintain unchanged vertical aim. Hence the operator may turn only the control knob 620 (FIG. 3) for causing the movable part 20 to rotate around the second axis 90, as indicated by double arrow 100 (FIG. 1).

When the operator has attained the desired horizontal positioning $H_B$ of the instrument, the above mentioned mechanical imperfections may have caused a small, but measurable change in vertical aim. In other words, the operation of the "horizontal" control knob 620 may cause an unintentional or inadvertent change in vertical aim.

According to an embodiment of the invention the values V, H on the outputs of calculation unit 220 are automatically read by devices 530, 630, and these values are stored in memory locations 550 and 650, respectively. The values stored in memory locations 550 and 650 are herein referred to as $V_B$ and $H_B$, respectively. This is illustrated in (Step 540, FIG. 4). It is to be noted that this change of direction (vertical in this case) is an ongoing process, but not necessarily linear in time). Thus new values $V_B$ and $H_B$ are sent to the memory locations as the movement proceeds and the old ones are the new values $V_A$, $H_A$.

In a subsequent step (Step 550, FIG. 4), the device 530 calculates the difference DV between the values $V_B$ and $V_A$, and device 630 calculates the difference DH between the values $H_B$ and $H_A$.

$$DV=V_B-V_A$$

$$DH=H_B-H_A$$

In the next step (Step 560, FIG. 4) the values are displayed.

The differential signal values DV, DH are delivered to an aim corrector 665. When the function "vertical aim lock" has been selected, the aim corrector 665 will deliver the differential signal value DV to controller 500 so as to adjust the vertical aim (Step 570, FIG. 4). The differential signal value DV is added to the vertical position control loop so that the surveying instrument 10 automatically compensates for all mechanical deviations in a servo drive fashion. Hence, when the operator has selected the function "vertical aim lock" the servo system will allow change in the horizontal aim only, and any undesired changes to the vertical aim will be automatically compensated. The control system may then resort in a last step (Step 580) to check that the differences in DV and/or DH is above/below a predetermined value and the procedure will then either proceed to Step 530, FIG. 4 or exit the procedure.

This method simplifies the work for the operator in that the operator can take an aim at any selected reference target, and then directly achieve a vertically correct aim in another horizontal direction. Hence, according to an aspect of the invention, any imperfections inherent in the mechanical construction causing a change in the vertical positioning V will be compensated. As indicated above, the compensation in the aim can be calculated in accordance with equation (1) above in conjunction with the procedure described above.

A Horizontal Aim Lock Function

Likewise if the procedure is made with the purpose of adjusting only the vertical aim, i.e. operating only the knob 520, this may cause a non-desired change in the horizontal aim H, due to the above mentioned mechanical imperfections. In a manner analogous to the manner described above, the operator may then select a function "horizontal aim lock" by means of the user interface. Selection of this function tells the surveying instrument 10 to make automated corrections for any deviations in horizontal aim. When the function "horizontal aim lock" has been selected, the aim corrector 665 will deliver the differential signal value DH to controller 600 so as to adjust the horizontal aim (Step 570, FIG. 4).

According to an embodiment of the invention the "horizontal aim lock" function comprises the steps of:

generating a horizontal reference value $R_H$ for indicating a selected horizontal orientation of said movable unit 20;

activating a horizontal aim lock function of the surveying instrument (10) for maintaining said selected horizontal orientation;

pivoting said movable unit 20 around said first axis 50 so as to change a vertical orientation of said movable unit 20;

detecting a horizontal orientation value $H_s$ related to rotation around said second axis 90;

receiving a horizontal error value DH indicative of a horizontal orientation deviation; said horizontal error value DH being dependent on said detected horizontal orientation value Hs;

automatically controlling a horizontal orientation of the movable unit 20 in dependence of said horizontal reference value $R_H$ and said horizontal error value DH wherein said horizontal error value DH is dependent on the vertical orientation of the movable part 20.

The differential signal values DV, DH may be delivered to the display 670 (See FIG. 3 and step S60 in FIG. 4) enabling the operator to read the values DV, DH in real time, or with a predetermined delay for the purpose of enabling improved readability.

A Second Embodiment of a Control System

Figure 5:
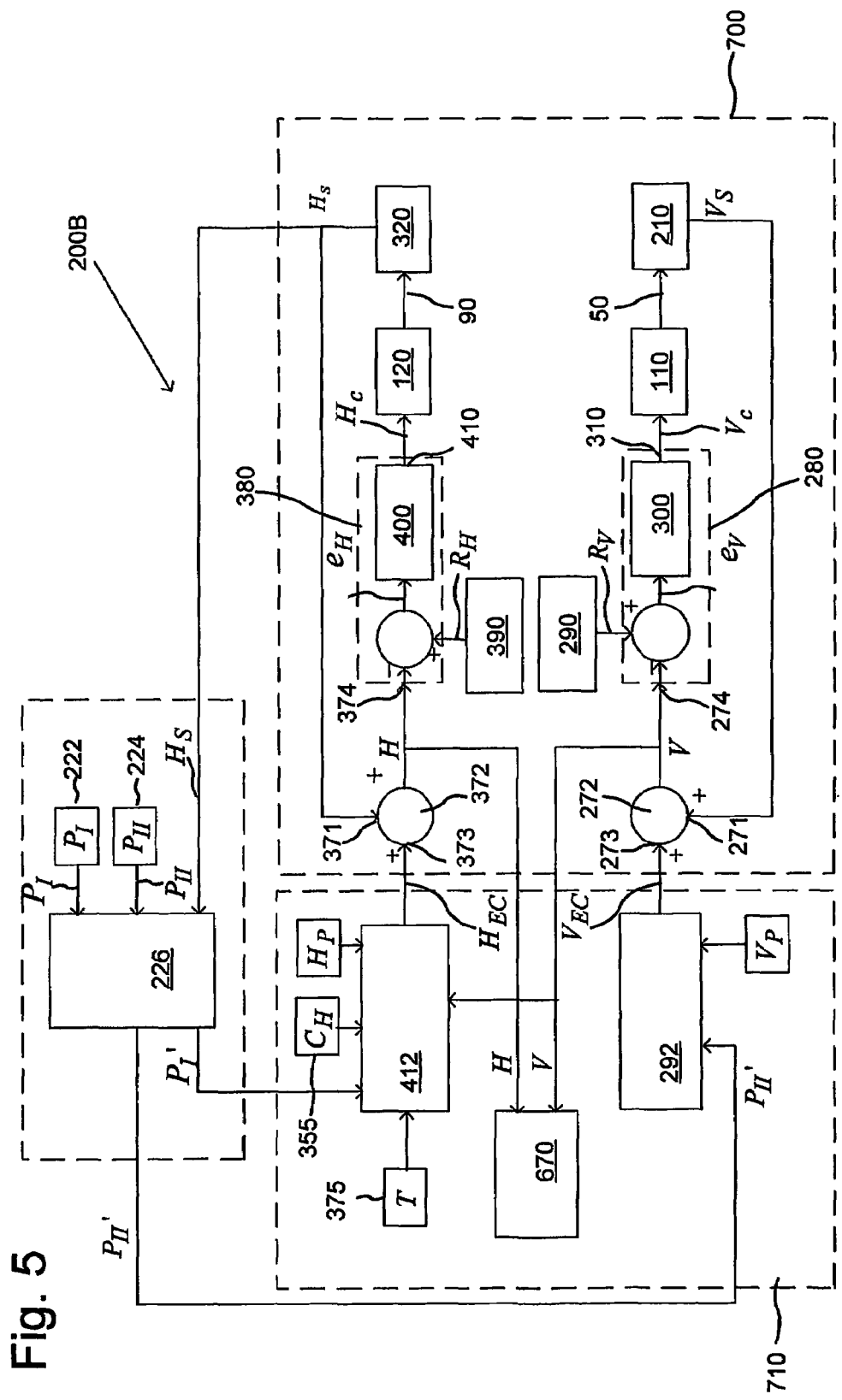
FIG. 5 shows a schematic block diagram of a second embodiment of a control system for use in a surveying instrument of the type shown in FIG. 1.

FIG. 5 shows a schematic block diagram of a second embodiment 200B of a control system for use in a surveying instrument 10 of the type shown in FIG. 1. The control system 200B operates to control the drive arrangements 110 and 120, respectively.

Vertical Aim

The control system 200B according to the second embodiment includes a vertical sensor 210 delivering a detected signal Vs to an input 271 of a vertical position generator 272. The vertical position generator 272 also has an input 273 for receiving a vertical error correction value $V_{EC}$. The vertical position generator 272 generates an accurate vertical position value V in response to the values received on the inputs 271 and 273.

The output signal V is delivered to an input 274 of a first controller 280. The first controller 280 also comprises an input 290 for a reference signal value Rv which may be set by a user or operator. The reference signal value $R_v$ is indicative of a desired value for the output value V.

An error signal $e_v$ is generated in the first controller 280 as a difference between the reference signal value $R_v$ and the output signal V. The error signal $e_v$ is delivered to a regulator 300. The regulator 300 has an output 310 for a vertical control signal $V_C$.

The vertical control signal $V_C$ is delivered to the drive arrangement 110 for causing an appropriate movement of the movable unit 20 around the trunnion axis 50. In this manner the control system 200B controls the vertical aim in response to the vertical reference signal value $R_V$, using the accurate vertical position value V generated by the vertical position generator 272.

The vertical error correction value $V_{EC}$ is generated by an error correction generator 292 in dependence of the vertical index Vp and the vertical plumb error value $P_{II}$. According to an aspect of the invention the value $V_{EC}$ is calculated as:

$$V_{EC}=Vp+P'_{II}$$

The values of the vertical index Vp and the vertical plumb error $P_{II}$ may be attained and delivered to the error correction generator 292 in the same manners as described above in connection with the earlier described embodiments. The value of Vp can be selected e.g. such that the output signal V is 90 degrees when the movable unit 20 is aimed such that the sight line 128 is horizontal. In a preferred embodiment the vertical plumb error value is a predicted value $P'_{II}$ delivered by a predictor 226, as described above. A tilt predictor advantageously provides substantially instantaneous information of the tilt status, as mentioned above.

Horizontal Aim

A horizontal sensor 320 delivers a detected signal Hs to an input 371 of a horizontal position generator 372. The horizontal position generator 372 also has an input 373 for receiving a horizontal error correction value $H_{EC}$. The horizontal position generator 372 generates an accurate horizontal position value H in response to the values received on the inputs 371 and 373. Horizontal control may be achieved in the same manner as described for vertical control above, involving: an input 374 of a controller 380 comprising an input 390 for a reference signal value $R_H$ which may be set by a user or operator; and an error signal $e_H$ generated dependent on a difference between the reference signal value $R_H$ and the accurate horizontal position value H; a regulator 400 having an output 410 for a horizontal control signal $H_C$ for controlling a drive arrangement 120 for causing an appropriate movement of the housing 40 around the second axis 90.

In this manner the control system 200B controls the horizontal aim in response to the horizontal reference signal value $R_H$, using the accurate horizontal position value H generated by the horizontal position generator 372.

A horizontal correction generator 412 generates the horizontal error correction value $H_{EC}$. According to an aspect of the invention the value $H_{EC}$ is calculated as:

$$H_{EC}=H_P+C_H/\sin V+(T+P'_I)*\cot V$$

wherein $H_P$ is a constant defining the angular position where the output signal H is zero.

It is to be noted that the above formula is actually a first approximation which is valid for small correction parameters ($C_H$, T, $P'_I$, $P'_{II}$), but the full formula is actually:

$$H_{EC}=H_P+C_H/\sin V+(T+P'_I)*\cot (V_P+V_S); (V=V_P+V_SP'_{II})$$

i.e. the value $P'_{II}$ should not be a part of the last term. But T and $P'_I$ are small corrections and $P'_{II}$ (which is comprised in the approximation) is also small. This renders the influence from this parameters to be "of the second order" and thus negligible.

In practice the first formula is used.

The values of the horizontal index $H_P$, trunnion axis error T and the horizontal plumb error may be attained in the same manners as described above in connection with the earlier described embodiments. The attained values of $H_P$, $C_H$, T and $P'_I$ are delivered to the error correction generator 412, which in turn operates to generate the error correction value $H_{EC}$ in response thereof. In a preferred embodiment the horizontal plumb error value is a predicted value $P'_I$ delivered by a predictor 226, as described above.

An operator may control the reference signal values $R_V$ and $R_H$. According to one version of the invention the signal $R_V$ is generated by a first control knob. Similarly the signal $R_H$ may be generated by a second control knob.

With reference to FIG. 5, control system 200B includes a positional control loop section 700. The positional control loop section 700 can operate at a high update rate to achieve fast and accurate control of the aim of the movable part 20, as described with reference to FIG. 6 below.

The error correction values $V_{EC}$ and $H_{EC}$ may be generated at a lower update rate, as described with reference to FIG. 7 below. Hence the error correction generators 292 and 412 may be included in an error correction section 710 of the control system 200B.

According to a preferred embodiment of the invention the positional control loop section 700 includes a first data processing unit, and the error correction section 710 includes a second data processing unit; wherein the first data processing unit has a higher data processing capacity than the second data processing unit. According to another embodiment the sections 700 and 710 may operate with other relations between their data processing capacities.

A Method of Operating a Surveying Instrument

Figure 6:
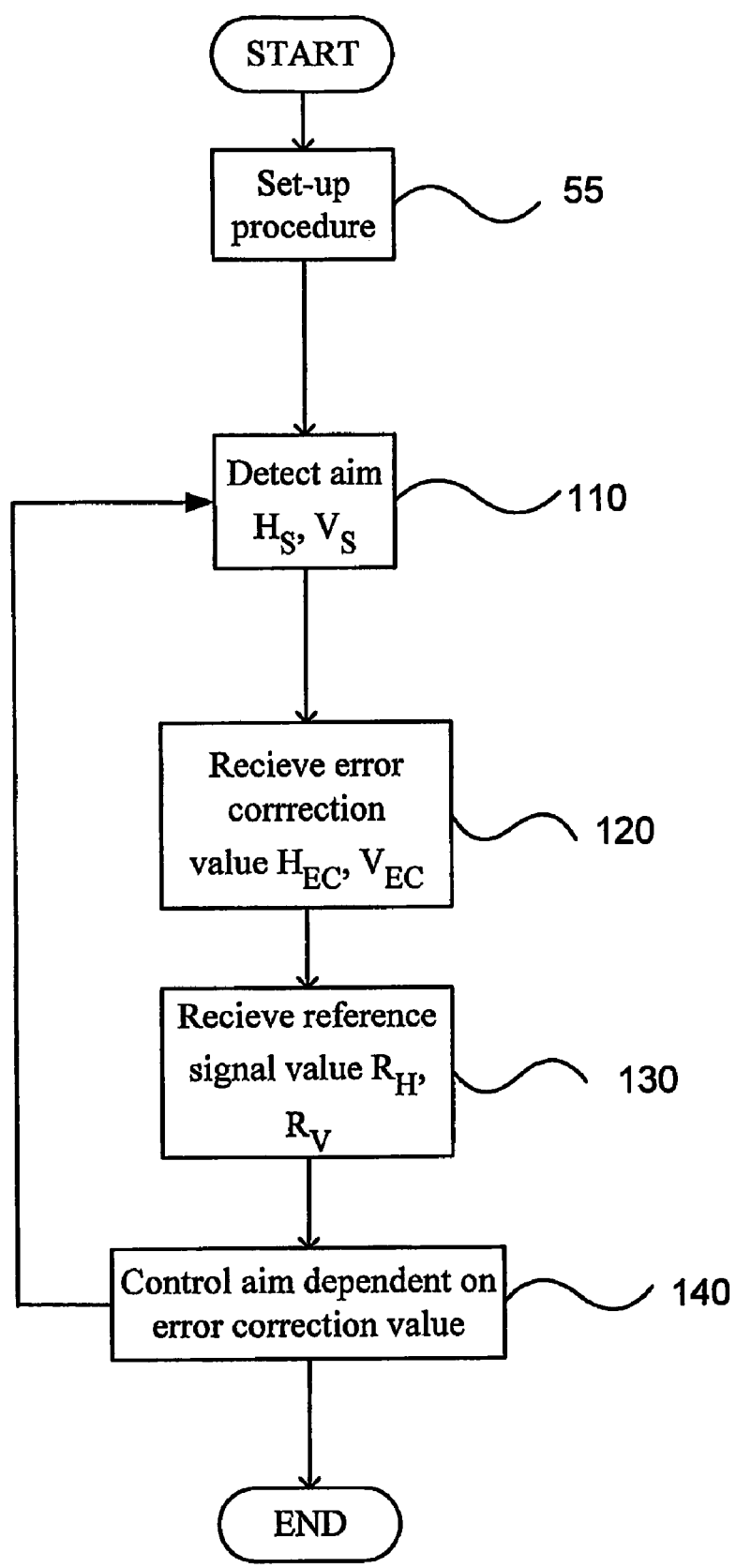
FIGS. 6 and 7 are flow charts illustrating an embodiment of a method of operating the control system according to FIG. 5.
Figure 7:
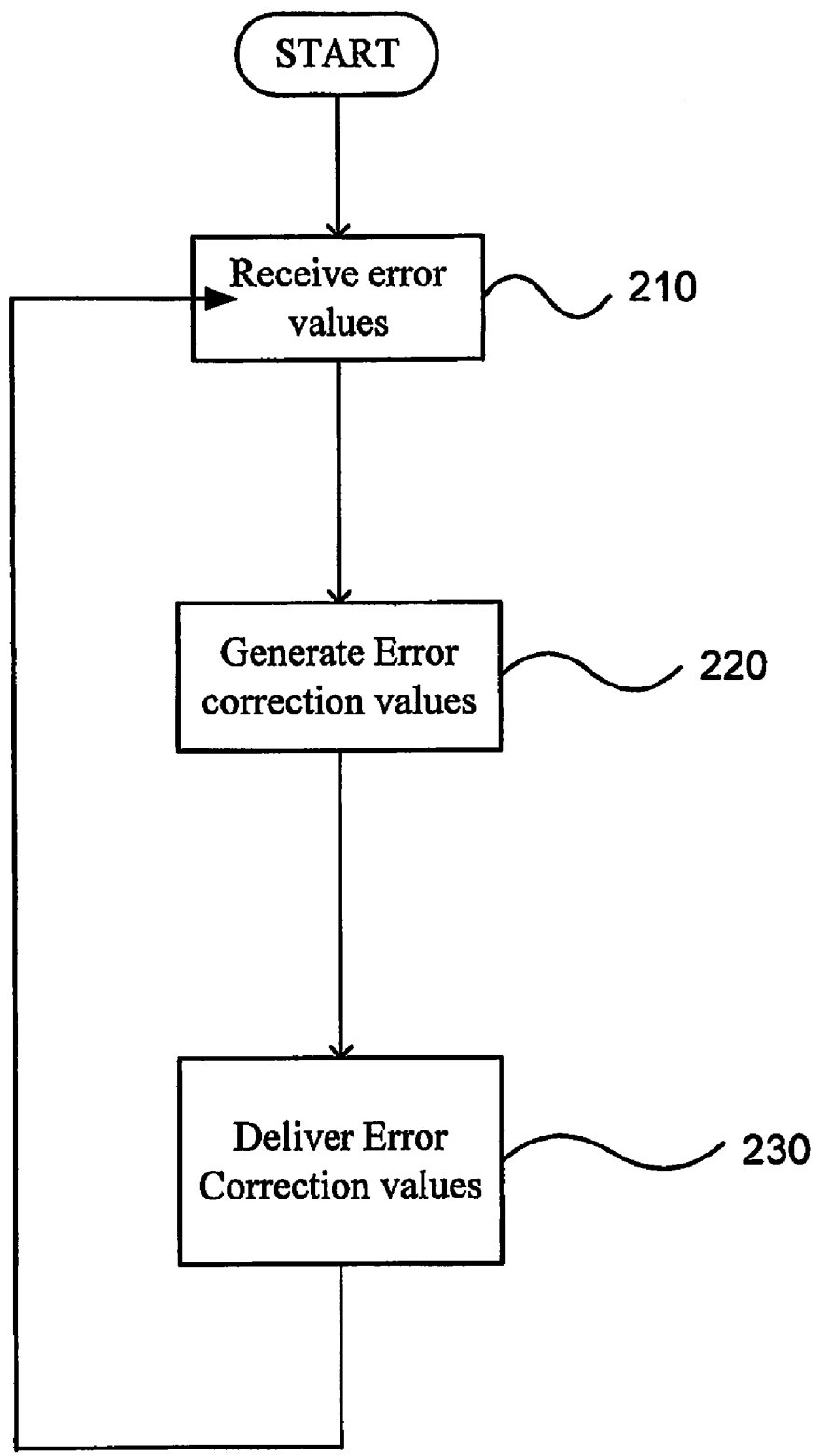

FIGS. 6 and 7 are flow charts illustrating an embodiment of a method of operating the control system according to FIG. 5.

With reference to FIG. 6, an operator may perform a set-up procedure Step 55, as described above before starting to make measurements. The detectors 210, 320 will deliver signals Vs, Hs indicating the detected aim (step S110). The position value generators 272 and 372 will receive error correction values $V_{EC}$ and $H_{EC}$, respectively, as indicated by box Step 120 in FIG. 6. In response to the detected aim and the relevant error correction value the position value generators 272 and 372 will deliver accurate aim values V and H, respectively. The controllers 280, 380 receive reference values $R_V$ and $R_H$, respectively, which may be set by a user. This is illustrated by Step 130 in FIG. 6.

As illustrated by Step 140 in FIG. 6, the controllers 280, 380 operate to control the aim, that is the positioning of the movable unit 20 (FIG. 1), in response to the accurate aim values V and H, respectively, and the relevant reference values $R_V$ and $R_H$.

The steps S110, S120, S130 and S140 may run in parallel for the vertical and the horizontal aim. After completion of step S140, the procedure is repeated again.

According to one embodiment of the invention, the method starts in response to a detected change in one of the received reference values $R_H$, $R_V$. This embodiment of a method according to the invention includes the steps of:

a) setting a horizontal reference value $R_H$ indicative of a desired horizontal orientation of said movable unit 20;

b) detecting a horizontal orientation value Hs indicative of a current rotational orientation around said second axis 90;

c) receiving a horizontal orientation correction value $H_{EC}$; DH indicative of a horizontal orientation deviation of said movable unit 20; wherein said horizontal orientation correction value $H_{EC}$; DH is generated in dependence of a transverse plumb error value $P_I$; $P'_{II}$; said transverse plumb error value $P_I$; $P'_I$ being dependent on said horizontal orientation of said movable unit 20; and wherein said received horizontal orientation correction value $H_{EC}$; DH is dependent on the vertical orientation V of the movable unit 20 so as to compensate for horizontal orientation deviations that may occur as a consequence of pivoting around said first axis 50;

d) generating a horizontal position value H indicative of a current horizontal orientation of said movable unit 20 in response to said horizontal orientation value Hs and said horizontal orientation correction value $H_{EC}$; DH;

e) generating a horizontal error value $e_H$ in dependence on said horizontal position value (H) and said horizontal reference value $R_H$;

f) automatically controlling the horizontal orientation of the movable unit (20) in dependence of said horizontal error value $e_H$.

According to a preferred embodiment the method further comprises:

g) repeating steps b) to f) until said horizontal error value $e_H$ is smaller than a predetermined threshold value $D_F$.

The magnitude of the predetermined threshold value $D_F$ determines the accuracy of the aim achieved. According to an embodiment the threshold value $D_F$ corresponds to an angle of ten arcseconds or less. According to another embodiment the threshold value $D_F$ corresponds to an angle of one arcsecond or less. According to a preferred embodiment the threshold value $D_F$ corresponds to an angle of one third of an arcsecond. According to a most preferred embodiment the threshold value $D_F$ corresponds to an angle of less than one third of an arcsecond.

In a corresponding manner a method according to the invention achieves automatic control of the vertical orientation of the movable unit in dependence on the vertical error value $e_V$. According to a preferred embodiment the method comprises the step of controlling the vertical orientation of the movable unit so that error $e_V$ is less than a predetermined threshold value $D_{VF}$.

FIG. 7 illustrates a method of delivery of the error correction values $V_{EC}$ and $H_{EC}$, respectively. In a step Step 210 error correction generator 292 receives the input values $V_P$ and $P'_{II}$. As mentioned above, the value of $P'_{II}$ can change in dependence of the current position of the alidade portion 40, but the rate of change of the value $P'_{II}$ is relatively slow.

The error correction generator 292 generates a vertical error correction value in response to the input values $V_P$ and $P'_{II}$ (Step 220), and the generated value is delivered (Step 230) to the position value generator 272.

Steps 210, 220 and 230 may be an iterative process so that step 230 is followed by a new execution of steps 210, 220 and 230, as indicated in FIG. 7.

The process of generating the horizontal error correction value $H_{EC}$ is performed in the same manner, but on the basis of the input signals T, $P_I$, $C_H$, $H_P$, and V.

The rate of change of the error correction values will, under normal operation, be much smaller than the rate of change of the detected position value $V_S$ or $H_S$ in response to a changed reference value $R_V$ or $R_H$. It may therefore be advantageous to allocate more computer power to the execution of the method described with reference to FIG. 6. The separation of the procedures for generating the error correction values $V_{EC}$ and $H_{EC}$ from the process of controlling the drivers 110, 120 advantageously makes it possible to release computer power. This is achieved by executing the procedure described with reference to FIG. 7 at a lower rate, while maintaining a highly accurate control of the positioning. In other words, this separation of procedures makes it possible to achieve an accurately updated position value and servo control of the positioning with a lower demand on the hardware.

According to an embodiment the control loop 700 described with reference to FIG. 6 operates with a repetition frequency exceeding 100 times per second (100 Hz); whereas the procedure according to FIG. 7 operates with less than half of that repetition frequency. According to one version the error correction values are updated at a rate of about one tenth of the repetition frequency of the control loop described with reference to FIG. 6.

According to a preferred embodiment the control loop described with reference to FIG. 6 operates with a repetition frequency exceeding 1000 times per second (1000 Hz).

The tilt predictor 226 may be included in a third section 720, as illustrated in FIG. 5. The tilt predictor 226 may operate to update predicted plumb error values $P'_I$ and $P'_{II}$, respectively, at the same repetition frequency as error correction values $H_{EC}$ and $V_{EC}$ are updated.

The surveying instrument 10 (FIG. 1) may include a laser adapted to send light in the direction of the sight line. When an operator changes the vertical reference value $R_V$, while maintaining a constant horizontal reference value, the laser light will sweep in a truly vertical fashion. The method according to embodiments of this invention will therefore enable the drawing of a very accurately vertical line on a wall, since it allows for servo control to eliminate the influence of the mechanical errors. Advantageously, the invention makes this possible even when the apparatus is mounted in a non-ideal position, e.g. even if the apparatus is positioned so that the second axis 90 deviates from the ideal, truly vertical axis.

Moreover, the surveying instrument 10 according to the invention advantageously simplifies for a user to aim in a first compass bearing and to use the surveying instrument 10 for indicating a second compass bearing exactly opposite said first compass bearing. A user may, for example first aim due North, and then achieve an aim in the true South compass bearing, by the simple action of pivoting the movable unit 20 around the first axis 50. This may be achieved by a method of operating the surveying instrument 10; the method comprising the steps of:

setting a desired first horizontal orientation of said movable unit 20 so that a horizontal component of the aim of a sight line 128 of said surveying instrument 10 is directed in a first compass bearing;

pivoting said movable unit 20 around said first axis 50 so as to change a vertical orientation of said movable unit 20 until said horizontal component of the aim of said sight line 128 of said surveying instrument 10 is directed in a second compass bearing; said second compass bearing deviating from said first compass bearing;

generating a horizontal position value H indicative of a current horizontal orientation of said movable unit 20 in response to a horizontal orientation correction value $H_{EC}$; said horizontal orientation correction value $H_{EC}$ being dependent on the vertical orientation V of the movable unit 20 so as to compensate for horizontal orientation deviations that may occur as a consequence of pivoting around said first axis 50;

automatically controlling a horizontal orientation of the movable unit 20 in dependence of said horizontal position value H so that said second compass bearing is opposite said first compass bearing.

According to one embodiment the above described method of operating the surveying instrument is performed in response to manual control of the direction reference value $R_V$ and/or $R_H$, respectively. This is achieved e.g. when a user manually operates the vertical control knob and/or the horizontal control knob of the surveying instrument.

According to another embodiment the controller in the surveying instrument is adapted to automatically compensate for detected errors during remote control of said surveying instrument. In this embodiment there may be provided a receiver (not shown) coupled to deliver the reference value $R_V$ and/or $R_H$ to the input 290 and/or input 390, respectively, in FIG. 5. A transmitter (not shown) comprising inputs for operation by a user is adapted to transmit data indicative of the reference value $R_V$ and/or $R_H$ to the receiver so as to cause the surveying instrument to be remotely controlled in response to the user inputs. The transmitter/receiver may communicate in a wireless manner, e.g via a radio link, or by means of modulated light. In one version the transmitter/receiver communicates optically by means of laser light, which is modulated to carry the information about the reference value $R_V$ and/or $R_H$. When a user manually operates control knobs on the transmitter for the reference value $R_V$ and/or $R_H$, the transmitter operates to deliver relevant direction data to the receiver. In response to reception of the direction data the receiver may operate to deliver adequate control signals so that to the reference value $R_V$ and/or $R_H$ are delivered to the reference value inputs 520, 620, 290, 390. According to a preferred embodiment the control system 200A, 200B includes a servo processor coupled to communicate with the receiver and the reference value inputs 290, 390, 520, 620. The transmitter and the receiver may be embodied by transceivers for allowing bi-directional communication.

In yet another version of the invention an operator may enter a certain target, in terms of co-ordinates or target reference values, via user inputs on the surveying instrument itself and in response thereto a processor in the surveying instrument will automatically calculate a corresponding direction of the sight line so as to direct the sight line towards the target. This may be achieved by entering the corresponding direction reference values into inputs 290 and 390 shown in FIG. 5. In yet another embodiment of the invention the co-ordinates or target reference values are entered on user inputs at a remote location and delivered to a transmitter at the remote location for transfer to the surveying instrument by means of a transmitter/receiver assembly, thereby causing the surveying instrument to automatically direct the sight line towards a target defined by the co-ordinates or target reference values. The transmitter/receiver assembly may operate in the same manner as described above.

In a further embodiment a procedure for a horizontal line function is disclosed. In some applications it is an advantage to be able to maintain a constant vertical height for setting out points or checking a construction on a wall or similar. To do this the operator may select a function "horizontal line" in the instrument menu.

Selection of "horizontal line" means that the surveying instrument will be controlled to make automated corrections of the vertical angle V to maintain a fixed aiming height when aiming to objects at known distances. The distances can e.g. be defined as laying on a predefined flat surface or straight line. To illustrate the function a vertical flat surface will be chosen. It will then be shown how to follow a horizontal line on any flat surface.

Figure 8:
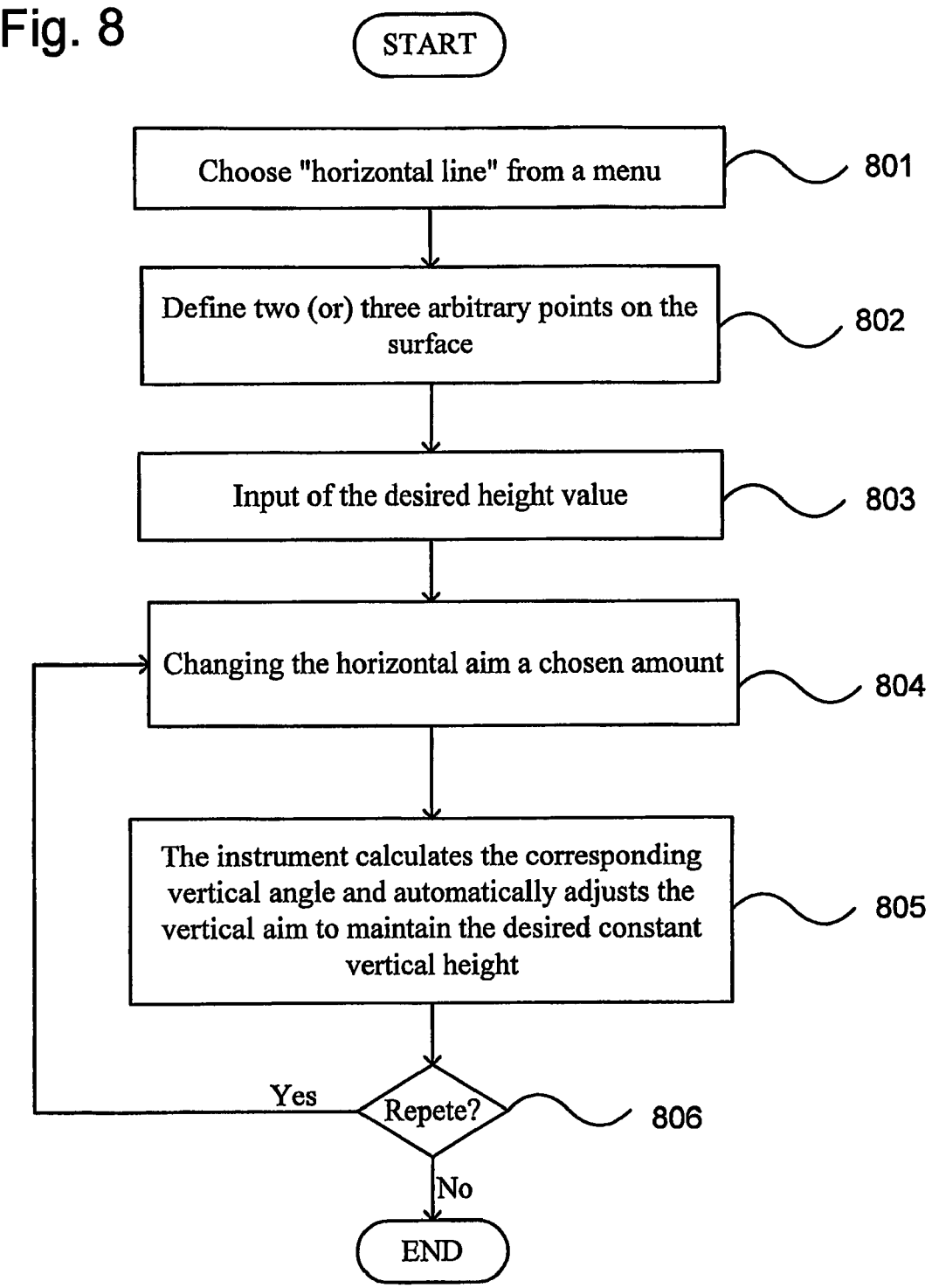
FIG. 8 is a flow chart illustrating an embodiment of a method of operating the surveying instrument in order to create a horizontal line.

The workflow is illustrated in the flow chart in FIG. 8. The procedure starts by the user choosing "horizontal line" from a menu on the instrument in step 801. In step 802, a surface is defined, which is normally done by defining two arbitrary points (A and B) on the surface. This can be done in different ways. Either, the points can be aimed at and the coordinates determined by distance and angle measurement using the instrument or the coordinates can be inputted into the instrument from the keyboard or they can be fetched from a database. In step 803 a reference height is defined. This can also be done in at least two different ways. Either the desired height can be inputted from the keyboard or the instrument can be aimed at a reference point on the actual surface having the desired height, and this height can be registered. Now, the parameters for the desired movement are defined and in step 804 a knob for horizontal angle change is turned. The instrument then can calculate for every horizontal angle the corresponding vertical angle and control the vertical servo to aim in the direction in step 805 that constitutes the desired height at the surface. In step 806 a decision is taken as to any further movement of the instrument.

Figure 9:
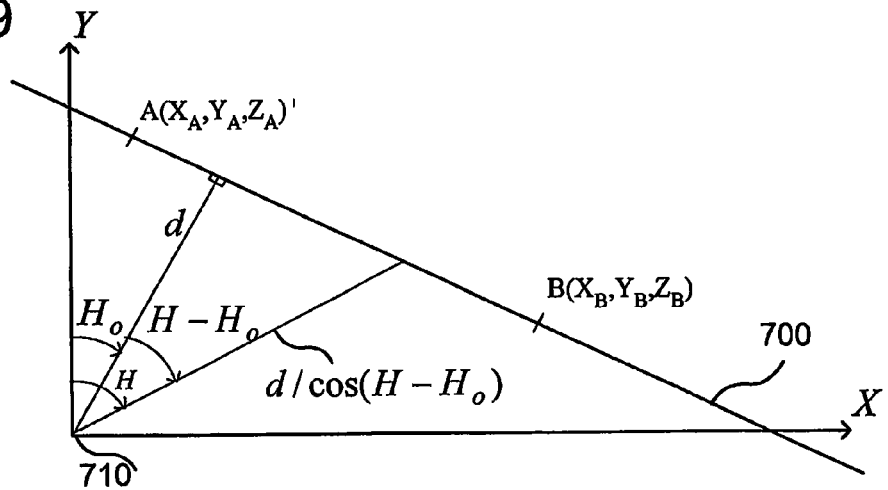
FIG. 9 shows a projection in the XY plane of the desired horizontal line at the desired height on a flat surface.
Figure 10:
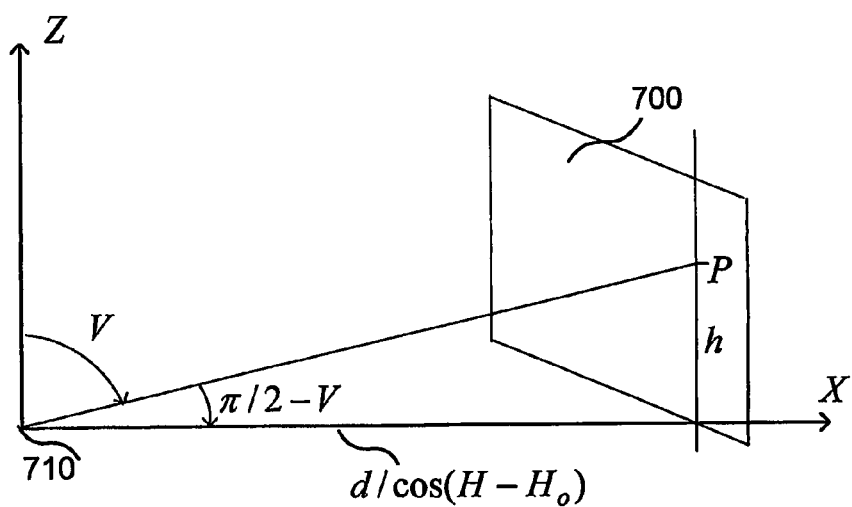
FIG. 10 shows a side view through the Z-axis of the instrument and an arbitrary point P on a surface.

The equation for calculating the actual vertical control angle can be derived from FIGS. 9 and 10.

FIG. 9 shows a projection of the vertical surface (700) and the instrument (710) in the horizontal XY plane.

FIG. 10 shows a side view through the Z-axis of the instrument and an arbitrary point P on the surface (700). The coordinates $(X_A, Y_A, Z_A)$ and $(X_B, Y_B, Z_B)$ of points A and B on the surface can be calculated using the distance and angles measured by the instrument; instrument position being (0, 0, 0) in this coordinate system.

From these coordinates, the equation of the projection of the surface in a horizontal plane can be found, and this defines the angle $H_0$ to a line perpendicular to the surface and the perpendicular distance to the surface d. The derivation can be found in a textbook on vector algebra.

Using the notation from FIGS. 9 and 10 it can be found that:

$$\tan(\pi/2 - V) = h * \cos(H - H_0)/d \quad (1)$$

or $$V = \pi/2 - \arctan[h * \cos(H - H_0)/d] \quad (2)$$

Thus the vertical angle V defining a constant height h on the given surface can be determined for any direction H using equation (2).

By using this value as an input reference value $R_V$ (this is done in step 805 in FIG. 8) to the vertical servo the instrument will always be aimed to a point at the surface at the same vertical height irrespective of the horizontal aiming.

The procedure as described above is exemplified by en embodiment shown in FIG. 8 in which the steps comprises:

Step 801 Choose "horizontal line" from a menu.
Step 802 Define two (or three) arbitrary points on the surface.
Step 803 Input of the desired height value.
Step 804 Turning of knob for changing the horizontal aim a chosen amount.
Step 805 The instrument calculates the corresponding vertical angle and automatic-ally adjusts the vertical aim to maintain the desired constant vertical height.
Step 806 A decision is taken as to repetition of step 804-step 805.

Following a horizontal line on a surface that is not vertical is very similar. The difference is that three points are needed to define the surface. Further FIG. 9 should be considered as a projection in the XY plane of the desired horizontal line at the desired height on the flat surface. Again known vector algebra will give the parameters d and $H_0$ to this projection and the equation for calculating the vertical angle V will be the same. From this it is apparent that it is possible to generate a line with a constant height on a flat surface with any orientation.

In a further embodiment a procedure for a line function between two arbitrary points is disclosed. In some applications it is of interest to let the aim of the instrument follow a strait line between two arbitrary points on a flat surface e.g. on a wall, a ceiling or a floor by manipulating only one knob. This function can be achieved in a similar manner as the as the horizontal aim function. First the two points have to be defined. This can be done in different ways. The coordinates of two points can be made available to the instrument from a database, they can be keyed in from the keyboard or they can be measured and calculated by the instrument.

Figure 11:
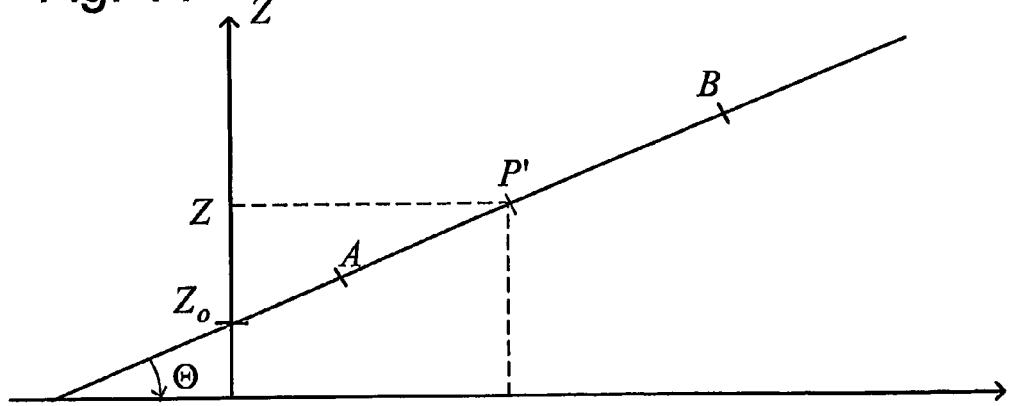
FIG. 11 shows two arbitrary points A and B projected on a ZY-plane, essentially a flat surface of any orientation.

In FIG. 11 is shown two points A and B projected on the ZY-plane. The points are supposed to lie on a flat surface of any orientation. The angle $\Theta$ and the height $Z_0$ can both be obtained from the coordinates of A and B by known methods in vector algebra. The intention is to control the instrument so that, when turning one knob, the aim direction of the instrument will follow a straight line between the points A and B, meaning that e.g. the spot of a pointing laser will follow this straight line on any flat surface containing the two points. Using the same FIG. 9 as before, the line through points A and B, denoted 700 is now considered to be the projection of the true line through A and B in the XY-plane and d is the orthogonal distance from the instrument to this line. Again the equation of the line through the points A and B as well as the projected distance d and angle $H_0$ can be determined using known vector algebra. Due to the geometry of the setup, the horizontal angle $H_0$ is by definition equal to the projected angle in the XY-plane. From FIG. 9 it is clear that the Y-coordinate of any point on the line can be calculated as:

$$Y = d^* \cos(H)/\cos(H-H_0) \quad (3)$$

FIG. 11 shows the projection of the points A and B on the vertical ZY-plane From FIG. 11, it can be found that the Z-coordinate of an arbitrary point (P') on the line through. A and B can be found from:

$$\tan(\Theta) = (Z-Z_0)/Y \text{ which gives}$$

$$Z = Z_0 + Y^* \tan(\Theta) \quad (4)$$

Now, consider a vertical plane through point P' and the instrument (the Z-axis). In equivalence to equation (1) we get:

$$\tan(\pi/2 - V) = Z^* \cos(H-H_0)/d \text{ or}$$

$$V = \pi/2 - \arctan[Z^* \cos(H-H_0)/d] \quad (5)$$

Substituting Z from (4) and Y from (3) we finally get:

$$V = \pi/2 - \arctan[Z_0^* \cos(H-H_0)/d + \cos(H)^* \tan(\Phi)] \quad (6)$$

Thus aiming in an arbitrary horizontal direction H, the corresponding vertical angle V to a point on the given line can be calculated, because $Z_0$, $H_0$ and $\Theta$ can all be obtained from the equation of the straight line. This value (V) can then be used as reference input to the vertical servo, meaning that when manipulating the knob for horizontal aiming, the vertical aiming can be controlled so that the total aiming follows a straight line between the given two points. Obviously this equation (6) can instead be solved for H, meaning that for an arbitrary vertical angle V, the corresponding horizontal angle H can be calculated. This means that by only manipulating the knob for vertical aiming, a straight line between the given points can be followed by using the calculated value for H as input to the horizontal servo.

Figure 12:
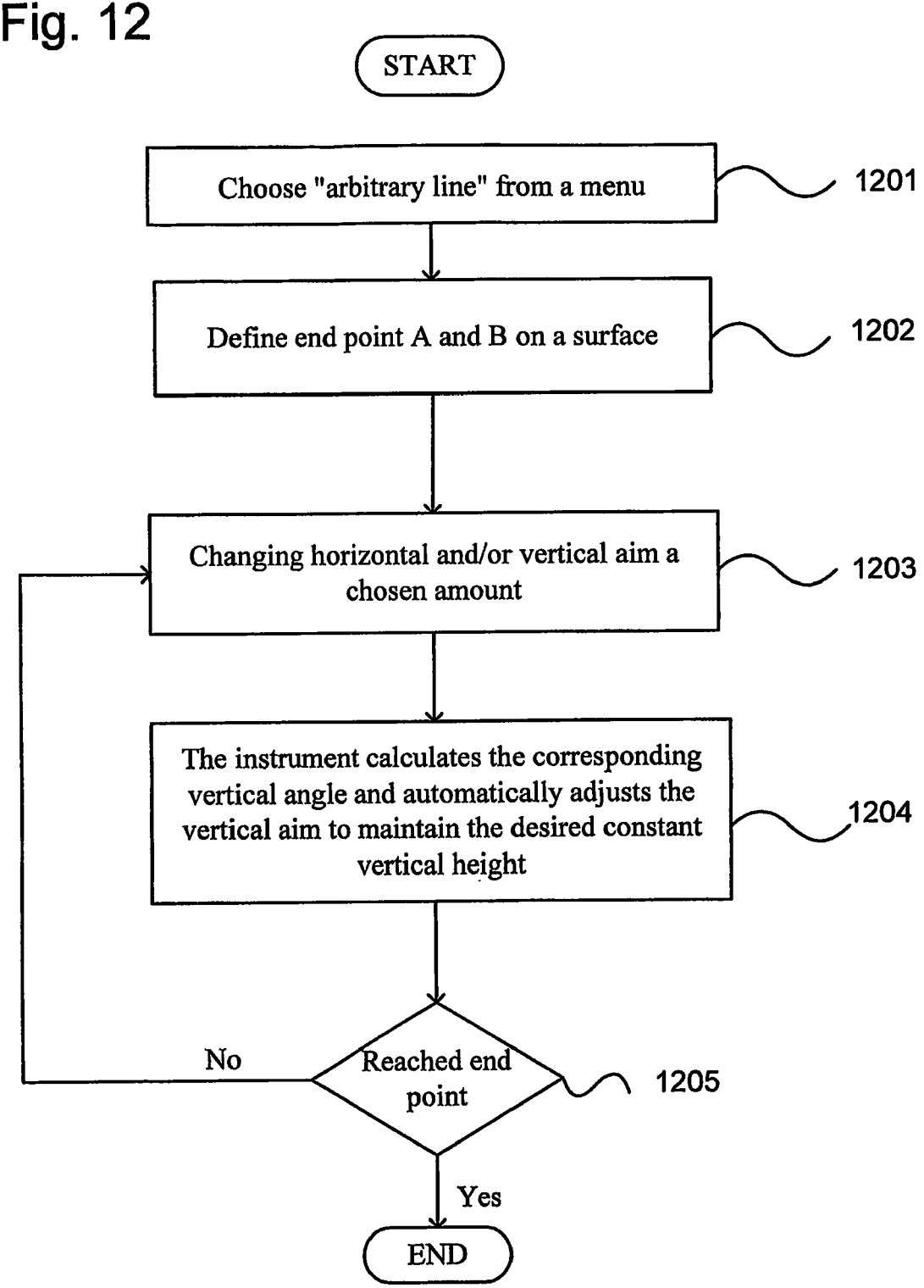
FIG. 12 is a flow chart illustrating an embodiment of a method of operating the surveying instrument in order to create an arbitrary line.

In FIG. 12 a flow chart for this function is shown.

Step 1201 Choose "arbitrary line" from a menu
Step 1202 Define end point A and B on a surface
Step 1203 Turning of either knob or both for horizontal or vertical movement a chosen amount.
Step 1204 The instrument calculates the corresponding vertical angle and automatically adjusts the vertical aim to maintain the desired constant vertical height.
Step 1205 In which it is decided if the end point has been reached and if not steps 1203-1205 are repeated until end.

Thus an arbitrary line may be drawn according to the invention through a method of operating a surveying instrument according to as earlier described, wherein said controller is adapted to automatically compensate for detected errors while following an arbitrary straight line between two points using the following steps:

define two points A and B on a plane, an arbitrary point on this straight line being denoted P';

calculate an angle $\Theta$, an angle $H_0$, a height $Z_0$, where $\Theta$ is the angle between a projected line in the YZ-plane through the instrument 710 (0,0,0), the angle $H_0$, being the angle in the XY-plane between the Y-axis and a line perpendicular to the projection of the line between A and B, and the height $Z_0$ being the height over ground where said line between A and B crosses the Z-axis, and use these values to control the movement of the instrument.

For using the horizontal manual control when aiming in an arbitrary horizontal direction H, the corresponding vertical angle V to a point on the line A-B is calculated from $Z_0$, $H_0$ and $\Theta$, this value V is the used as an input as reference input to the vertical servo, allowing a manipulation of the knob for horizontal aiming such that the vertical aiming is controlled such as allowing the instrument to follow a straight line between said two points.

For using the vertical manual control when aiming in an arbitrary vertical direction H, the corresponding vertical angle V to a point on the line A-B, where H is calculated from $Z_0$, $H_0$ and $\Theta$, this value H is the used as an input as reference input to the horizontal servo, allowing a manipulation of the knob for vertical aiming such that the horizontal aiming is controlled such as to allow the instrument to follow a straight line between said two points.

The invention has been described using embodiments of the invention. It is to be understood, however, that other expedients known to those skilled in the art or disclosed herein may be employed without departing from the scope of the appended claims.

The invention claimed is:

1. A method of operating a surveying instrument placed in a orthogonal XYZ-system at (0,0,0) having a movable unit, said instrument defining a sight line that is controllably rotatable around a first axis, essentially horizontal, and around a second axis, essentially vertical, wherein said second axis may be inaccurately positioned so that it deviates from a true vertical axis, and said first axis may deviate from being orthogonal to the second axis; the method comprising the steps of determining at least one of the following group of errors relating to the instrument and/or its location:
   a) a trunnion axis error T as a function of the deviation from 90 degrees between the first axis and the second axis;
   b) a horizontal collimation error $C_H$, being the deviation between the sight line and the perpendicular angle as related to the first axis; and
   c) a total plumb error defined by components, $P_I$ and $P_{II}$, being two separate angular values defining the tilt of the instrument as related to the plumb line through the same; and
   d) using these determined values in continuously controlling the alignment when aiming the instrument.

2. A method of operating a surveying instrument according to claim 1, wherein the adjustment is performed using a controller comprising a microprocessor for controlling the alignment of the instrument.

3. A method of operating a surveying instrument according to claim 2, wherein said controller is adapted to automatically compensate for determined errors while following an arbitrary straight line between two points using the following steps: define two points A and B on a plane; calculate an angle $\Phi$, a height $Z_0$, and an angle $H_0$, where $\Phi$ being the vertical angle between a projection of said arbitrary line in the YZ-plane through the instrument (0,0,0) and the Z-axis, the height $Z_0$ being the height where said projection crosses the Z-axis, and the angle $H_0$, being the angle in the XY-plane between the Y-axis and a line perpendicular to the projection of the line between A and B, and using these values to control the movement of the instrument.

4. A method of operating a surveying instrument according to claim 3, wherein when aiming in an arbitrary horizontal angle H the corresponding vertical angle V to a point on the line A-B is calculated from $Z_0$, $H_0$ and $\Phi$, this value V is then used as a reference input to a vertical servomotor, resulting in that the vertical aiming is so controlled that the instrument will follow a straight line between said two points when manipulating a knob for horizontal aiming.

5. A method of operating a surveying instrument according to claim 3, wherein when aiming in an arbitrary vertical angle V the corresponding horizontal angle H to a point on the line A-B, where H is calculated from $Z_0$, $H_0$ and $\Phi$, this value H is used as d reference input to a horizontal servomotor, resulting in the instrument following a straight line between said two points when manipulating a knob for vertical aiming.

6. A method of operating a surveying instrument according to claim 2, wherein said controller is adapted to automatically compensate for determined errors while following a horizontal straight line on a plane using the following steps:
   define the plane orientation by measuring the position of at least two points on the plane; input the desired height value h;
   calculate the perpendicular angle $H_0$ to the projection of the desired horizontal line in the XY-plane; for any horizontal angle H, calculate the corresponding vertical angle V, and use this value to control a vertical servo.

7. A method of operating a surveying instrument according to claim 2 wherein the aiming of the movable unit (20) may be effected using a vertical servomotor and a horizontal servomotor and where the horizontal servomotor is controlled to compensate for said errors, resulting in that when a knob for vertical aiming is manipulated, the aiming will follow a plump line.

8. A method of operating a surveying instrument, said instrument having a movable unit that is controllably rotatable around a first axis and around a second axis, wherein said second axis may be inaccurately positioned so that it deviates from a true vertical axis, and said first axis may deviate from being orthogonal to the second axis; the method comprising the steps of:
   a) setting a horizontal reference value ($R_H$) indicative of a desired horizontal orientation of said movable unit;
   b) detecting a horizontal orientation value (Hs) indicative of a current rotational orientation around said second axis;
   c) receiving a horizontal orientation correction value ($H_{EC}$; DH) indicative of a horizontal orientation deviation of said movable unit; wherein said horizontal orientation correction value ($H_{EC}$; DH) is generated in dependence of a transverse plumb error value ($P_I$; $P'_I$); said transverse plumb error value ($P_I$; $P'_I$) being dependent on said horizontal orientation of said movable unit; and
      wherein said received horizontal orientation correction value ($H_{EC}$; DH) is dependent on the vertical orientation (V) of the movable unit so as to compensate for horizontal orientation deviations that may occur as a consequence of pivoting around said first axis;
   d) generating a horizontal position value (H) indicative of a current horizontal orientation of said movable unit in response to said detected horizontal orientation value (Hs) and said horizontal orientation correction value ($H_{EC}$; DH);
   e) generating a horizontal error value ($e_H$) in dependence on said horizontal position value (H) and said horizontal reference value ($R_H$);
   f) automatically controlling the horizontal orientation of the movable unit in dependence of said horizontal error value ($e_H$).

9. The method according to claim 8, further comprising
   g) repeating steps b) to f) of claim 1 until said horizontal error value ($e_H$) is smaller than a predetermined threshold value ($D_F$).

10. The method according to claim 8, wherein
   said horizontal orientation correction value ($H_{EC}$; DH) is dependent on a predicted transverse plumb error value ($P'_I$); and wherein
   the predicted transverse plumb error value ($P'_I$) is generated in dependence on said detected horizontal orientation value (Hs).

11. The method according to claim 8, wherein
   said horizontal orientation correction value ($H_{EC}$; DH) is generated in response a measured transverse plumb error value ($P_I$); said measured transverse plumb error value ($P_I$) being inherently dependent on the horizontal position of the movable unit when the transverse plumb error ($P_I$) deviates from zero.

12. The method according to claim 8 wherein
   steps b), d), e) and f) of are performed with a first repetition frequency; and wherein
   said horizontal orientation correction value ($H_{EC}$; DH) is updated with a second repetition frequency; said second repetition frequency being lower than said first repetition frequency.

23

13. The method according to claim 12, wherein
said transverse plumb error value is updated with said second repetition frequency.

14. The method according to claim 9, wherein
said predetermined threshold value ($D_F$) is less than ten arcseconds.

15. The method according to claim 8, wherein
said predetermined threshold value ($D_F$) is less than one arcsecond.

16. The method according to claim 8, further comprising the step of:
pivoting said movable unit around said first axis so as to change a vertical orientation (V) of said movable unit.

17. The method according to claim 8, wherein:
said vertical orientation (V) of the movable unit is generated in dependence of a longitudinal plumb error value ($P_{II}$; $P'_{II}$); said longitudinal plumb error value ($P_{II}$; $P'_{II}$) being dependent on said horizontal orientation of said movable unit.

18. A method of operating a surveying instrument having a movable unit that is controllably rotatable around a first axis and around a second axis, wherein said second axis may be inaccurately positioned so that it deviates from a true vertical axis, and said first axis may deviate from being orthogonal to the second axis; the method comprising the steps of:
setting a desired first horizontal orientation of said movable unit so that a horizontal component of the aim of a sight line of said surveying instrument is directed in a first compass bearing;
pivoting said movable unit around said first axis so as to change a vertical orientation (V) of said movable unit until said horizontal component of the aim of said sight line of said surveying instrument is directed in a second compass bearing; said second compass bearing deviating from said first compass bearing;
generating a horizontal position value (H) indicative of a current horizontal orientation of said movable unit in response to a horizontal orientation correction value ($H_{EC}$); said horizontal orientation correction value ($H_{EC}$) being dependent on the vertical orientation (V) of the movable unit so as to compensate for horizontal orientation deviations that may occur as a consequence of pivoting around said first axis;
automatically controlling a horizontal orientation of the movable unit in dependence of said horizontal position value (H) so that said second compass bearing is opposite said first compass bearing.

19. A method of operating a surveying instrument having a movable unit that is controllably rotatable around a first axis and around a second axis, wherein said second axis may be inaccurately positioned so that it deviates from a true vertical axis, and said first axis may deviate from being orthogonal to the second axis; the method comprising the steps of:
a) setting a vertical reference value ($R_v$) indicative of a desired vertical orientation of said movable unit;
b) detecting a vertical orientation value (Vs) indicative of a current rotational orientation around said first axis;
c) receiving a vertical orientation correction value ($V_{EC}$; DV) indicative of a vertical orientation deviation of said movable unit; wherein
said vertical orientation correction value ($V_{EC}$; DV) is generated in dependence of a longitudinal plumb error value ($P_{II}$; $P'_{II}$); said longitudinal plumb error value ($P_{II}$; $P'_{II}$) being dependent on a horizontal orientation of said movable unit;
d) generating a vertical position value (V) indicative of a current vertical orientation of said movable unit in response to said detected vertical orientation value (Vs) and said vertical orientation correction value ($V_{EC}$; DV);
e) generating a vertical error value ($e_v$) in dependence on said vertical position value (V) and said vertical reference value ($R_v$);
f) automatically controlling a vertical orientation of the movable unit in dependence of said vertical error value ($e_v$).

20. The method according to claim 19, further comprising
g) repeating steps b) to f) until said vertical error value ($e_v$) is smaller than a predetermined threshold value ($D_{VF}$).

21. The method according to claim 19, wherein
said vertical orientation correction value ($V_{EC}$; DV) is dependent on a predicted longitudinal plumb error value ($P'_{II}$); and wherein
the predicted longitudinal plumb error value ($P'_{II}$) is generated in dependence on a detected horizontal orientation value (Hs).

22. The method according to claim 19, wherein
said vertical orientation correction value ($V_{EC}$; DV) is generated in response a measured longitudinal plumb error value ($P_{II}$); said measured longitudinal plumb error value ($P_{II}$) being inherently dependent on the current horizontal position of the movable unit.

23. The method according to claim 19, wherein
steps b), d), e) and f) of claim 12 are performed with a first repetition frequency; and wherein
said vertical orientation correction value ($V_{EC}$; DV) is updated with a second repetition frequency; said second repetition frequency being lower than said first repetition frequency.

24. The method according to claim 19, wherein said plumb error value is updated with said second repetition frequency.

25. The method according to claim 20, wherein said predetermined threshold value ($D_{VF}$) is less than ten arcseconds.

26. The method according to claim 20, wherein said predetermined threshold value ($D_{VF}$) is less than one arcsecond.

27. The method according to claim 20, further comprising the step of:
pivoting said movable unit around said second axis so as to change a horizontal orientation of said movable unit.

28. A surveying instrument having a movable unit that is controllably rotatable around a first axis and around a second axis, wherein said second axis may be inaccurately positioned so that it deviates from a true vertical axis, and said first axis may deviate from being orthogonal to the second axis; the surveying instrument further comprising:
means for generating a transverse plumb error value ($P_I$; $P'_I$); said transverse plumb error value ($P_I$; $P'_I$) being dependent on said horizontal orientation of said movable unit;
a horizontal error corrector (412) adapted to generate a horizontal orientation correction value ($H_{EC}$; DH) in dependence of a vertical position value (V) and said transverse plumb error value ($P_I$; $P'_I$); wherein said vertical position value (V) is indicative of a vertical orientation of said movable unit; and
a controller having:
a) an input for receiving a horizontal reference value ($R_H$) indicative of a desired horizontal orientation of said movable unit;
b) a sensor for detecting a horizontal orientation value (Hs) indicative of a current rotational orientation around said second axis;
c) an input for receiving said horizontal orientation correction value ($H_{EC}$; DH) indicative of a horizontal orientation deviation of said movable unit; and d) a horizontal position generator adapted to generate a horizontal position value (H) indicative of a current horizontal orientation of said movable unit in response to said detected horizontal orientation value (Hs) and said horizontal orientation correction value ($H_{EC}$; DH); and e) means for generating a horizontal error value ($e_H$) in dependence on said horizontal position value (H) and said horizontal reference value ($R_H$); wherein f) said controller is adapted to automatically control the horizontal orientation of the movable unit in dependence of said horizontal error value ($e_H$).

29. The surveying instrument according to claim 28, wherein
said controller is adapted to control the horizontal orientation of the movable unit so that said horizontal error value ($e_H$) is smaller than a predetermined threshold value ($D_F$).

30. The surveying instrument according to claim 28, wherein said controller is adapted to control the orientation of the movable unit such as to compensate for a detected trunnion error.

31. The surveying instrument according to claim 28, wherein
said movable unit further comprises optical equipment defining a sight line for allowing said movable unit to be aimed at a target position; wherein said sight line may deviate from being orthogonal to the first axis; said deviation constituting a Horizontal Collimation error;
said surveying instrument further comprising a memory for storing an established Horizontal Collimation error value ($C_H$); and wherein
said horizontal error corrector has an input coupled to receive said established Horizontal Collimation error value ($C_H$); said horizontal error corrector being adapted to generate said horizontal orientation correction value ($H_{EC}$; DH) in dependence of said established Horizontal Collimation error value ($C_H$) so as to obtain compensation for said Horizontal Collimation error.

32. The surveying instrument according to claim 28, wherein said means for generating a transverse plumb error value ($P_T$; $P'_T$) comprises a predictor adapted to generate a predicted transverse plumb error value ($P'_T$) in dependence on said detected horizontal orientation value (Hs).

33. The surveying instrument according to claim 32, wherein said horizontal error corrector is adapted to generate said horizontal orientation correction value ($H_{EC}$; DH) in dependence of said predicted transverse plumb error value ($P'_T$).

34. The surveying instrument according to claim 28 wherein
said controller is adapted to generate an updated horizontal error value ($e_H$) with a first repetition frequency; and wherein
said horizontal error corrector is adapted to generate an updated horizontal orientation correction value ($H_{EC}$; DH) with a second repetition frequency; said second repetition frequency being lower than said first repetition frequency.

35. The surveying instrument according to claim 26, wherein
said transverse plumb error value is updated with said second repetition frequency.

36. The surveying instrument according to claim 28, further comprising:
means for generating a longitudinal plumb error value ($P_{II}$; $P'_{II}$); said longitudinal plumb error value ($P_{II}$; $P'_{II}$) being dependent on said horizontal orientation of said movable unit;
a vertical error corrector adapted to generate a vertical error correction value ($V_{EC}$) in dependence of said longitudinal plumb error value ($P_{II}$; $P'_{II}$);
a sensor for detecting a vertical orientation value (Vs) indicative of a current rotational orientation around said first axis; and
a vertical position generator adapted to generate said vertical position value (V) of the movable unit in dependence of said vertical error correction value ($V_{EC}$) and said detected vertical orientation value (Vs); and wherein
said horizontal error corrector is adapted to generate said horizontal orientation correction value ($H_{EC}$; DH) in dependence of said generated vertical position value (V) and said transverse plumb error value ($P_T$; $P'_T$).

37. A surveying instrument (having a movable unit that is controllably rotatable around a first axis and around a second axis, wherein said second axis may be inaccurately positioned so that it deviates from a true vertical axis, and said first axis may deviate from being orthogonal to the second axis; the surveying instrument comprising:
means for generating a longitudinal plumb error value ($P_{II}$; $P'_{II}$); said longitudinal plumb error value ($P_{II}$; $P'_{II}$) being dependent on said horizontal orientation of said movable unit;
a vertical error corrector adapted to generate a vertical error correction value ($V_{EC}$) in dependence of said longitudinal plumb error value ($P_{II}$; $P'_{II}$);
a controller having:
a) an input for a vertical reference value ($R_v$) indicative of a desired vertical orientation of said movable unit;
b) a sensor for detecting a vertical orientation value (Vs) indicative of a current rotational orientation around said first axis; and
c) an input for receiving a vertical orientation correction value ($V_{EC}$; DV) indicative of a vertical orientation deviation of said movable unit; wherein
said vertical orientation correction value ($V_{EC}$; DV) is generated in dependence of a longitudinal plumb error value ($P_{II}$; $P'_{II}$); said longitudinal plumb error value ($P_{II}$; $P'_{II}$) being dependent on said horizontal orientation of said movable unit;
d) a vertical position generator adapted to generate a vertical position value (V) of the movable unit in dependence of said vertical error correction value ($V_{EC}$) and said detected vertical orientation value (Vs);
e) means for generating a vertical error value ($e_v$) in dependence on said vertical position value (V) and said vertical reference value ($R_v$); wherein
f) said controller is adapted to automatically control a vertical orientation of the movable unit in dependence of said vertical error value ($e_v$).

38. The surveying instrument according to claim 37, wherein
said controller is adapted to control the vertical orientation of the movable unit so that said vertical error value ($e_v$) is smaller than a predetermined threshold value ($D_{VF}$).

39. The surveying instrument according to claim 37, wherein
said means for generating a longitudinal plumb error value ($P_{II}$; $P'_{II}$) comprises a predictor adapted to generate a predicted longitudinal plumb error value ($P'_{II}$) in dependence on said detected horizontal orientation value (Hs).

40. An error compensation system for a surveying instrument comprising:
an automatic error measurement system for detecting a tilt error and an error due to mechanical imperfections in said surveying instrument; and
a controller adapted to automatically compensate for said detected errors by controlling a servo system of the instrument so as to correct for detected errors when operating said surveying instrument.

41. The error compensation system according to claim 40, wherein said detected errors include a trunnion error (T).

42. The error compensation system according to claim 40, wherein said detected errors include a horizontal collimation error ($C_H$).

43. The error compensation system according to claim 40, wherein said controller co-operates with said automatic error measurement system so as to cause a sight line of said surveying instrument to move in a vertical direction in response to manual control of a vertical direction reference value ($R_v$) wherein the error from true verticality is less than a predetermined amount.

44. The error compensation system according to claim 40, wherein said controller co-operates with said automatic error measurement system to cause a point, on a sight line, at an arbitrary fixed distance from said surveying instrument to move in a horizontal direction in response to manual control of a horizontal direction reference value ($R_H$) wherein the error from true horizontal is less than a predetermined amount.

45. The error compensation system according to claim 40, wherein
said automatic error measurement system comprises a first error correction generator for generating a vertical error correction value ($V_{EC}$) and a second error correction generator for generating a horizontal error correction value ($H_{EC}$) dependent on said detected errors; and wherein
said controller is adapted to achieve said error compensation in dependence of said vertical and horizontal error correction values ($V_{EC}$, $H_{EC}$).

46. The error compensation system according to claim 45, wherein
said first error correction generator is adapted to generate the vertical error correction value ($V_{EC}$) in dependence on a longitudinal plumb error value ($P_{II}$; $P'_{II}$); and
said second error correction generator is adapted to generate the horizontal error correction value ($H_{EC}$) in accordance with the following equation:

$$H_{EC} = H_P + C_H/\sin V + (T + P'_T) \cdot \cot V$$

wherein $H_P$ is a constant; T is a detected trunnion axis error; $P'_T$ is a horizontal plumb error value; V is a vertical position value dependent on said vertical error correction value ($V_{EC}$), and $C_H$ is a horizontal collimation error.

47. The error compensation system according to claim 45, wherein
said controller is adapted to generate an updated control signal with a first repetition frequency; and wherein said automatic error measurement system is adapted to generate said error correction values with a second repetition frequency; said second repetition frequency being lower than said first repetition frequency.

48. The error compensation system according to claim 43, wherein
said predetermined amount is less than ten arcseconds.

49. The error compensation system according to claim 43, wherein
said predetermined amount is less than one arcsecond.

50. The error compensation system according to claim 43, wherein said predetermined amount is less than one third of an arcsecond.

51. The error compensation system according to claim 48, wherein
said controller is adapted to automatically compensate for said detected errors during manual control of said surveying instrument.

52. The error compensation system according to claim 51, wherein
said manual control of said surveying instrument includes manual control of a direction reference value.

53. The error compensation system according to claim 40, wherein said controller is adapted to automatically compensate for said detected errors during remote control of said surveying instrument.

54. The error compensation system according to claim 40, wherein said controller is adapted to automatically compensate for said detected errors during automatic control of said surveying instrument.

55. The error compensation system according to claim 40, wherein said controller is adapted to automatically compensate for determined errors while following an arbitrary straight line between two points using the following steps:
define two points A and B on a plane; calculate an angle $\Phi$, a height $Z_0$, and an angle $H_0$, where $\Phi$ being the vertical angle between a projection of said arbitrary line in the YZ-plane through the instrument (0,0,0) and the Z-axis, the height $Z_0$ being the height where said projection crosses the Z-axis, and the angle $H_0$, being the angle in the XY-plane between the Y-axis and a line perpendicular to the projection of the line between A and B, and using these values to control the movement of the instrument.

56. The error compensation system according to claim 55, wherein when aiming in an arbitrary horizontal direction H the corresponding vertical angle V to a point on the line A-B is calculated from $Z_0$, $H_0$ and $\Phi$, this value V is the used as an input as reference input to the vertical servomotor, allowing a manipulation of a knob for horizontal aiming such that the vertical aiming is controlled such as allowing the instrument to follow a straight line between said two points.

57. The error compensation system according to claim 55, wherein when aiming in an arbitrary vertical direction V the corresponding horizontal angle H to a point on the line A-B, where H is calculated from $Z_0$, $H_0$ and $\Phi$, this value H is then used as a reference input to the horizontal servomotor, allowing a manipulation of a knob for vertical aiming such that the horizontal aiming is controlled such as to allow the instrument to follow a straight line between said two points.

58. A surveying instrument including an error compensation system according to claim 40.

* * * * *